United States Patent
Metcalfe et al.

(10) Patent No.: US 7,277,191 B2
(45) Date of Patent: Oct. 2, 2007

(54) FAST EFFICIENT WINDOW REGION COALESCING IN A TWO-PASS AUTO-WINDOWING ENVIRONMENT

(75) Inventors: David J. Metcalfe, Marion, NY (US); Jeng-nan Shiau, Webster, NY (US)

(73) Assignee: Xerox Corporation, Stamford, CT (US)

( * ) Notice: Subject to any disclaimer, the term of this patent is extended or adjusted under 35 U.S.C. 154(b) by 835 days.

(21) Appl. No.: 09/894,160

(22) Filed: Jun. 27, 2001

(65) Prior Publication Data

US 2003/0002087 A1    Jan. 2, 2003

(51) Int. Cl.
G06K 1/00 (2006.01)
G06F 15/00 (2006.01)

(52) U.S. Cl. ............ 358/1.12; 358/453; 358/538; 382/165

(58) Field of Classification Search .......... 358/1.9, 358/450, 453, 462, 538, 540, 1.12, 461; 382/165, 382/540; 345/501, 622; 711/202, 218
See application file for complete search history.

(56) References Cited

U.S. PATENT DOCUMENTS

| | | | | |
|---|---|---|---|---|
| 5,047,955 A | * | 9/1991 | Shope et al. | 358/1.12 |
| 5,465,307 A | * | 11/1995 | Azumaya et al. | 382/165 |
| 5,502,458 A | * | 3/1996 | Braudaway et al. | 345/593 |
| 5,546,474 A | * | 8/1996 | Zuniga | 382/176 |
| 5,790,133 A | * | 8/1998 | Holcomb et al. | 345/501 |
| 5,805,724 A | | 9/1998 | Metcalfe et al. | 382/176 |
| 5,850,474 A | | 12/1998 | Fan et al. | 382/173 |
| 5,864,408 A | * | 1/1999 | Kumashiro | 358/461 |
| 5,912,672 A | * | 6/1999 | Liguori | 345/619 |
| 5,978,791 A | * | 11/1999 | Farber et al. | 707/2 |
| 6,157,736 A | | 12/2000 | Jodoin et al. | 382/173 |
| 6,175,427 B1 | | 1/2001 | Lehmbeck et al. | 358/1.9 |

OTHER PUBLICATIONS

Haralick, Robert, et al., Computer and Robot Vision, Addison-Wesley Publishing Company, vol. I, 1992, pp. 30-47.

* cited by examiner

*Primary Examiner*—David Moore
*Assistant Examiner*—James A. Thompson
(74) *Attorney, Agent, or Firm*—Fay Sharpe LLP

(57) ABSTRACT

A method and apparatus are provided for the processing of an image, such as a document. The invention determines the location of differing content types within the document allowing specialized processing of various content types. The invention performs the identification of pixels having similar content characteristics into windows during the first scanning pass of the document by the use of an identifier equivalence table to update selected memory locations to a base identifier during processing. A second pass processing is available to enhance or alter the image by the use of the information gathered during first pass processing. The present invention benefits from a very low memory requirement while being able to determine windows extending the length or width of the image.

19 Claims, 25 Drawing Sheets

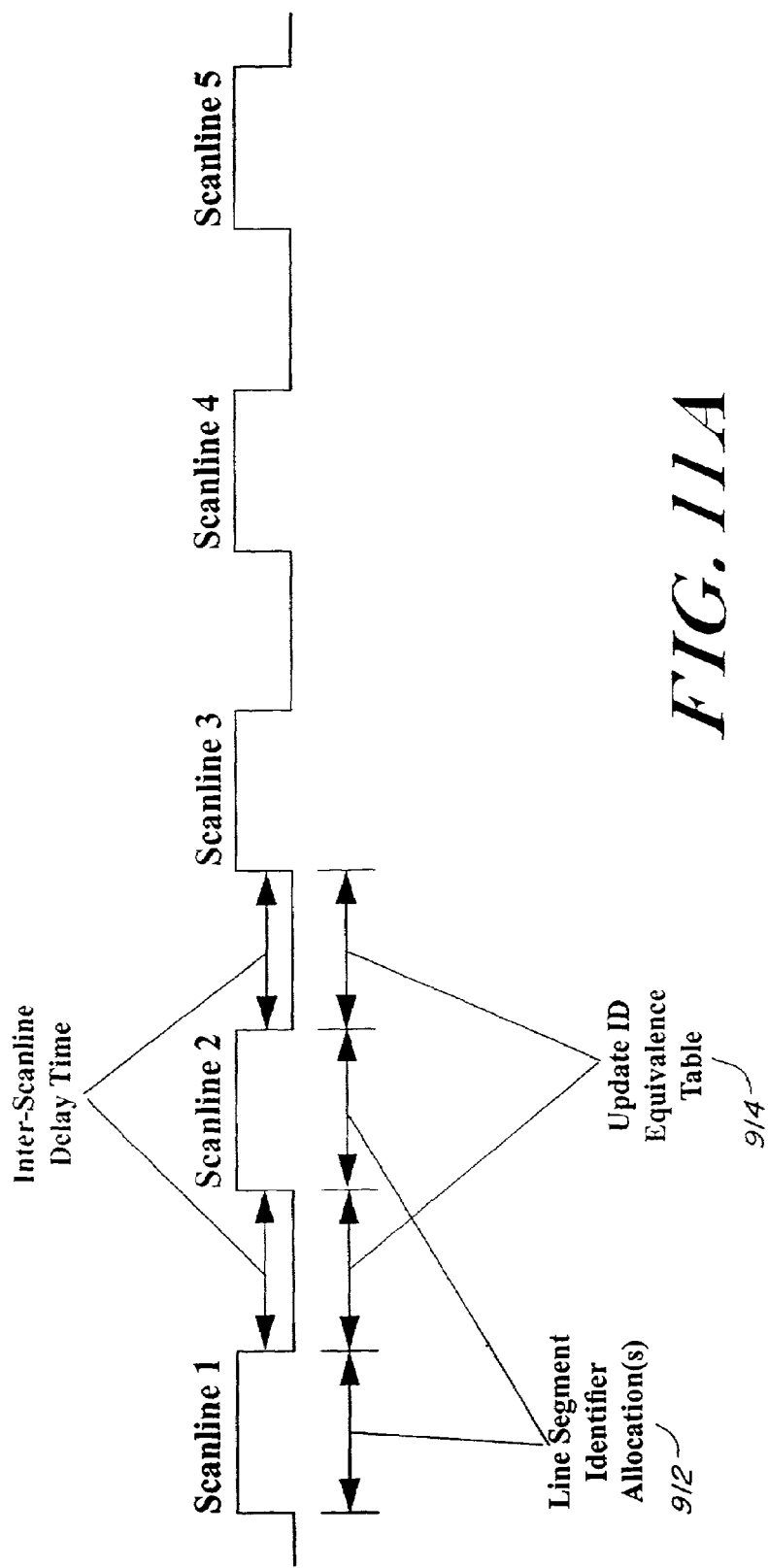

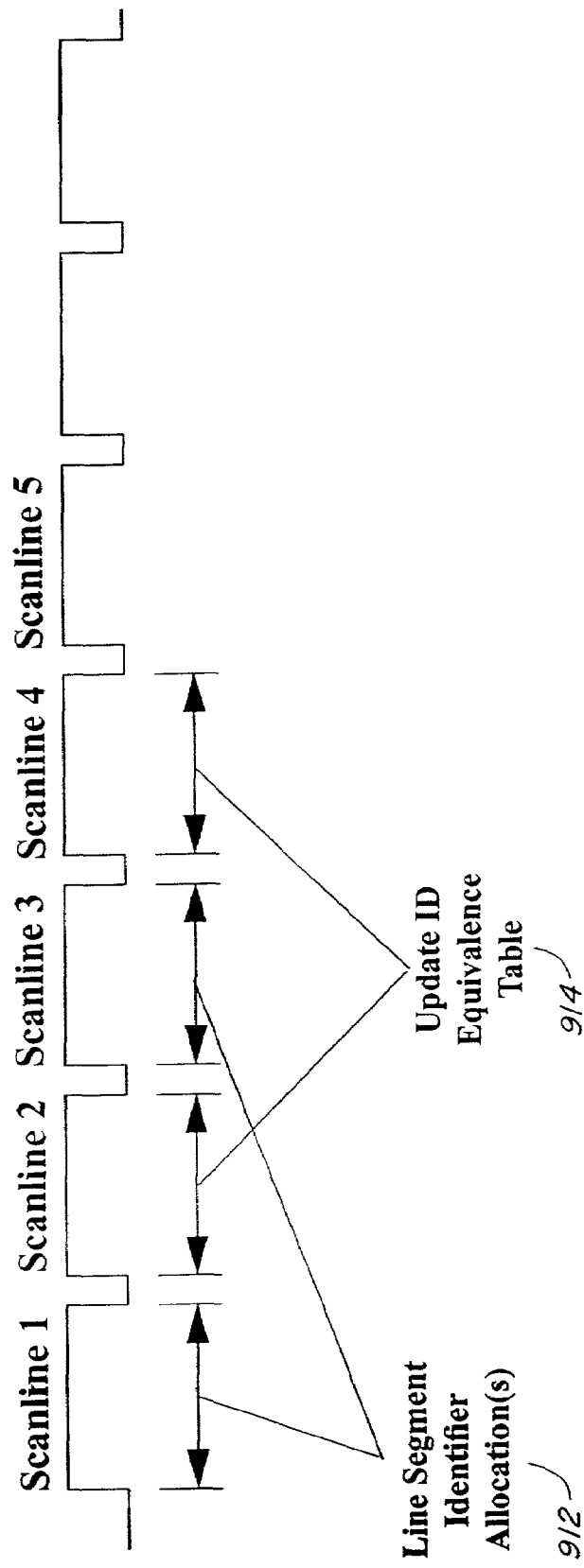

*300*

| Address | Entry |
|---------|-------|
| 1 | 1 |
| 2 | 2 |
| 3 | 3 |
| 4 | 6 |
| 5 | 5 |
| 6 | 6 |
| 7 | 7 |
| - | - |

*FIG. 12*

RAM A
Scanline 3

| Line Segment ID | Line Segment Tag | Line Segment Start Position |
|---|---|---|
| 7 | Non White | 1 |
| 2 | White | 5 |
| 5 | Non White | 15 |
| - | - | - |
| - | - | - |
| - | - | - |

202 →
206 →
210 →

RAM B
Scanline 2

| Line Segment ID | Line Segment Tag | Line Segment Start Position |
|---|---|---|
| 2 | White | 1 | ← 204
| 3 | Non White | 7 | ← 208
| 6 | White | 9 | ← 212
| 5 | Non White | 17 | ← 216
| - | - | - |
| - | - | - |

| Address | Entry |
|---|---|
| 1 | 1 |
| 2 | 2 |
| 3 | 3 |
| 4 | 6 |
| 5 | 5 |
| 6 | 2 |
| 7 | 7 |
| - | - |

|  | Entry /307 | BaseID /308 | Window /309 |
|---|---|---|---|
| Address | | | |
| 1 | 1 | True | W1 |
| 2 | 2 | True | W2 |
| 3 | 3 | True | W3 |
| 4 | 6 | False | |
| 5 | 5 | True | W4 |
| 6 | 2 | False | |
| 7 | 7 | True | W5 |
| - | - | - | - |

*FIG. 18A*

|  | Entry /307 | BaseID /308 | Window /309 |
|---|---|---|---|
| Address | | | |
| 1 | 1 | True | W1 |
| 2 | 2 | True | W2 |
| 3 | 3 | True | W3 |
| 4 | 2 | False | |
| 5 | 5 | True | W4 |
| 6 | 2 | True | W2 |
| 7 | 7 | True | W5 |
| - | - | - | - |

*FIG. 18B*

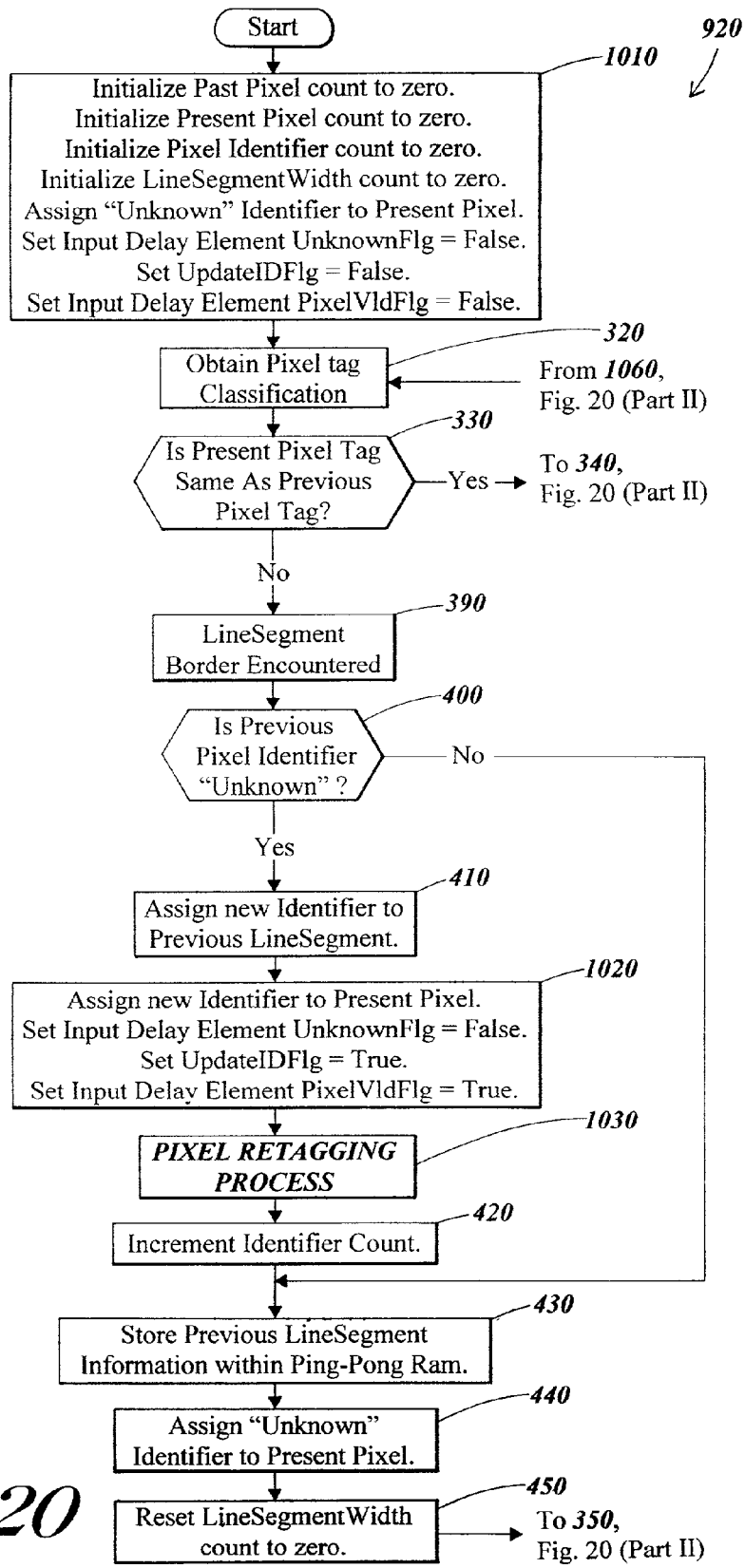
FIG. 20 (PART I)

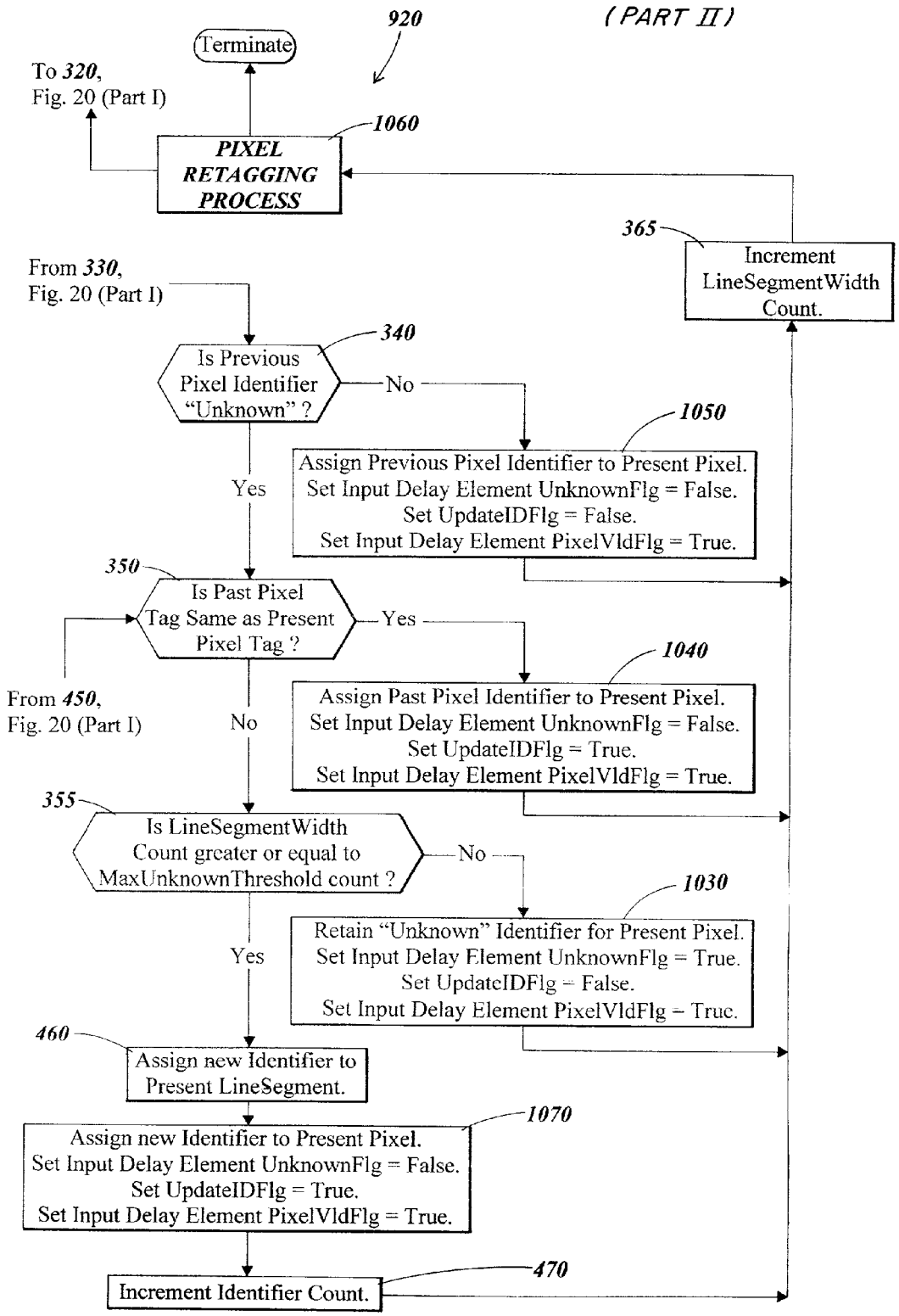
FIG. 20 (PART II)

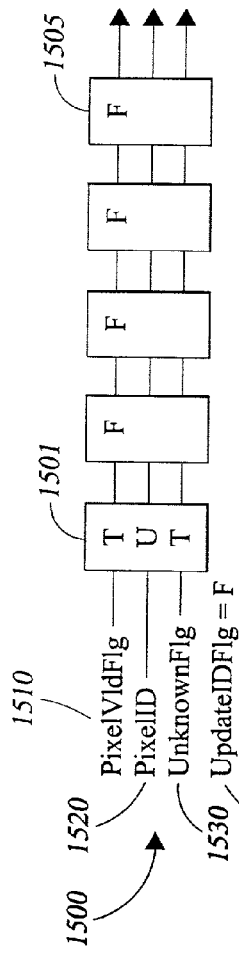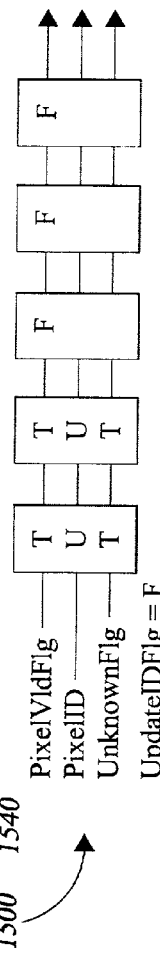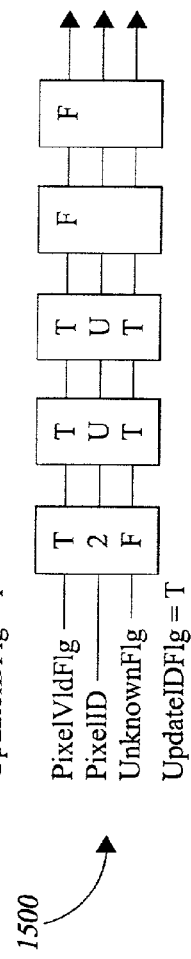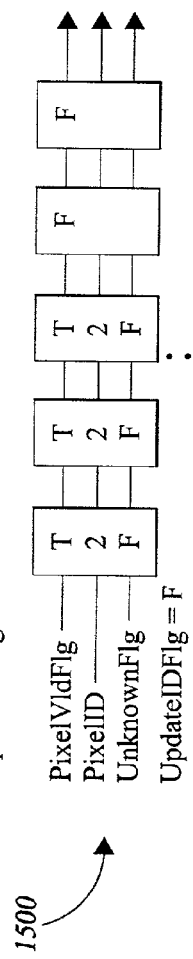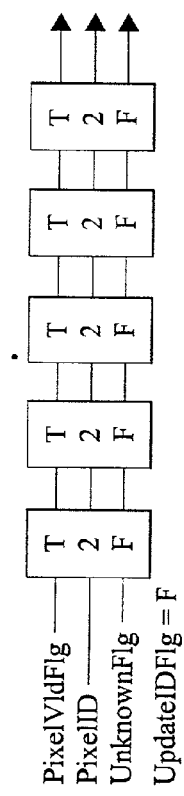

FAST EFFICIENT WINDOW REGION COALESCING IN A TWO-PASS AUTO-WINDOWING ENVIRONMENT

FIELD OF THE INVENTION

The invention relates generally to the processing of documents and specifically to the identification and grouping of individual portions of a scanned document to enhance or modify the document.

BACKGROUND OF THE INVENTION

The processing of scanned documents is typically enhanced by the ability to process different content types within a document differently. For example, processing of a document involving both text and halftone images can be enhanced by processing text differently from halftone images or one color differently from another color.

A wide variety of imaging technologies benefit from processing differing content types differently. For example, printing technologies, such as electrophotographic, electrostatic, electrostatographic, ionographic, acoustic, piezo, thermal, laser, ink jet, and other types of image forming or reproducing systems adapted to capture and/or store image data associated with a particular object, such as a document, and reproduce, form, or produce an image may provide improved results by altering processing depending on the content type. Furthermore, scanning of documents for electronic storage or other electronic processing, such as optical character recognition or digital photo manipulation or storage, can be improved by tailored processing of different content types.

"Auto-windowing" is a process of determining contiguous areas of a document, e.g. windows, of one content type. By way of example, auto-windowing can group an area of text into a window, areas of white space into multiple windows and a halftone image into one or more windows depending on the composition of the halftone image.

Typically, the ability to determine the locations of differing content types is performed on a page-by-page basis and has involved multiple stages of processing of each full page of the document after an initial scanning process. Therefore, a large memory capacity is required to process each full page. Some conventional methods have involved multiple full-page scans of each page. Typically, substantial amounts of time are required because of the extensive processing and multiple stages that have been required, limiting the use of auto-windowing in high speed document processing.

For many image-processing algorithms, such as filtering, the page is processed on a scan line by scan line basis. Ideally, the algorithm for grouping content types into windows would have available as many scan lines as required in order to determine where one region encounters (e.g. grows into) another region. Previously, this has required extensive processing time for average page sizes.

As a result of the above-noted limitations of conventional methods, the ability to incorporate tailored processing of differing content types within a document has been difficult to implement in high-speed document processing machines. Such capabilities have also been difficult to inexpensively implement because of the substantial memory requirements.

SUMMARY OF THE INVENTION

The present invention overcomes the difficulties of the prior art by the use of an identifier equivalence table that is updated to include a base identifier for a window during the first pass of processing the document. This equivalence table is then used to enable a second pass of processing the document to recognize windows of the document having a common content type.

According to one embodiment of the invention, a method of processing an image, such as a document, is provided having the steps of obtaining content data about a plurality of pixels in an image, grouping pixels having similar content data to form a plurality of line segments, associating line segments from the plurality of line segments into at least a first window and a second window, wherein the first window and the second window represent similar pixels according to the content data and storing information pertaining to the line segments determined during the step of associating, wherein the information associates each line segment with a corresponding window.

According to another embodiment of the invention, a method of processing an image is provided having the steps of comparing a first identifier of a first line segment on a first line on the image to a second identifier of a second line segment on a second line on the image, wherein the first line and the second line are parallel to a first axis and the first line segment overlaps the second line segment along the first axis and if the first identifier does not equal the second identifier, conducting a base identifier search to determine a base identifier for the first line segment.

A method of processing an image is provided according to another embodiment of the invention, having the steps of determining a first segment tag for a first line segment on a first line parallel to a first axis, writing a first identifier into a first memory location and assigning the first identifier to the first line segment, determining a second segment tag for a second line segment on a second line parallel and proximate to the first line wherein the second line segment overlaps a position of the first line segment along the first axis. If the first segment tag equals the second segment tag, writing the first identifier to a second memory location, but if the first segment tag does not equal the second segment tag, then writing a second identifier into a second memory location and assigning the second identifier to the second line segment, reading a first memory location to determine a first memory location content, pointing to a further memory location corresponding to the first memory location content, if the first memory location content does not point to the first memory location, reading a further memory location content of the further memory location and continuing to point to succeeding memory locations until a memory location content points to its own memory location and designating the memory location as a base identifier along with writing the base identifier to the first memory location.

According to another embodiment of the invention, an apparatus for processing an image is provided with a memory adapted to store at least one of the group of a first identifier of a first line segment on a first line and a second identifier of a second line segment on a second line and a processor coupled to the memory and adapted to compare the first identifier to the second identifier, determine a first segment tag for the first line segment, determine that the first line segment is eligible for a base identifier search if the first identifier does not equal the second identifier and conduct a base identifier search for the first line segment. Wherein the first line and the second line are parallel to a first axis and the first line segment overlaps the second line segment.

A method for processing an image is also provided according to another embodiment and having the steps of determining a pixel tag corresponding to a pixel content type of a pixel of a first row, determining a pixel identifier based on the pixel tag and pixel identifiers of neighboring pixels in the first row and in a neighboring second row, forming line segments of neighboring pixels of the first row having common pixel identifiers and reviewing line segments of the second row and the first row to associate line segments of the second row neighboring line segments of the first row and having common pixel tags.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

FIGS. 11A and 11B provides time lines showing relationship between line segment identifier allocation and updating of the identification number equivalence table;

FIG. 12 provides illustration of an identification number equivalence table;

FIG. 14 provides an illustration of a line segment memory;

FIG. 15 provides an illustration of an identification number equivalence table;

FIGS. 18A-18C provide illustrations of an update table during interdocument delay processing according to an illustrative embodiment of the present invention;

FIG. 20 illustrates a method of second pass processing according to an illustrative embodiment of the present invention;

FIGS. 21A through 21E provide illustrations of a buffer memory according to an illustrative embodiment of the present invention;

DETAILED DESCRIPTION OF THE INVENTION

The present invention overcomes the difficulties of the prior art by the use of an identifier equivalence table that is updated to include a base identifier for each window during the first pass of processing the document. Frequent updating of the identifier equivalence table allows the rapid determination of window locations during the first pass of processing the document, requiring minimal memory and time. Various embodiments of the present invention are well suited to applications involving high speed document processing.

As described above, auto-windowing is a process of establishing windows of a contiguous content type. Content types may include text, white space, halftone images, or any other type of imprint or image. Each page of a document may have multiple windows of text or other content type. Preferably, each contiguous content type area will be contained in one window.

According to an embodiment of the present invention, each page of the document is divided into pixels, preferably arranged in a grid having rows and columns. A sample image 10, representing a portion of a page 15 of a document, is provided in FIG. 1 for purposes of illustration. The page 15 of the document, including the sample image 10, is divided into pixels 30.

Each pixel 30 is assigned a pixel tag to identify the content type of the pixel. The pixel tags are determined by the characteristics of the corresponding portion of the scanned document. For example, a pixel tag may indicate that the pixel of the image is either white or non-white. Optionally, pixel tags may be used to represent further or alternative distinctions of the content type of the corresponding portion of the image. For example, a pixel tag may indicate a pixel corresponding to a half-tone image, text, a color graphic, a particular color, white space or other image characteristic beneficial for later processing.

Figure 1:
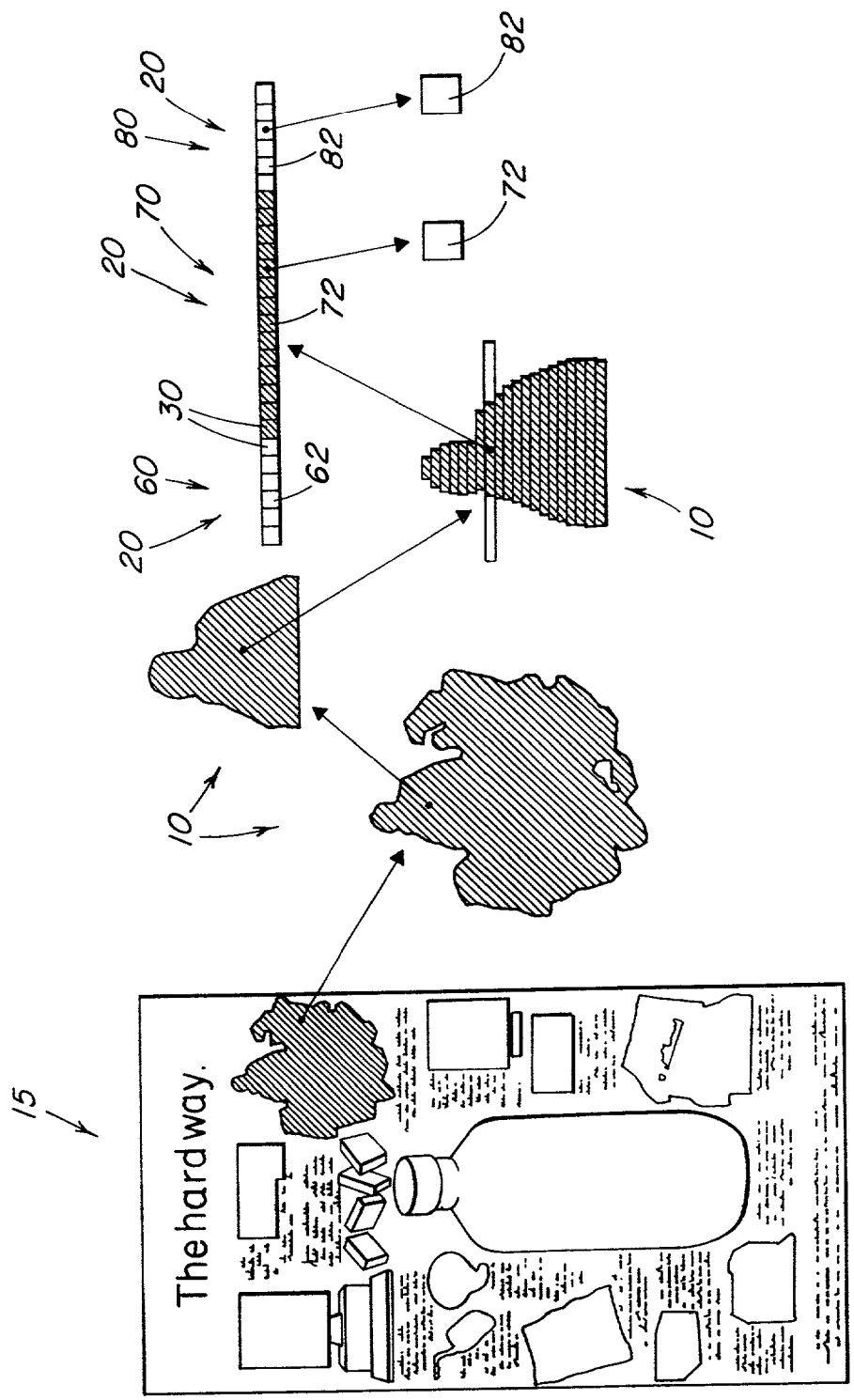
FIG. 1 is a conceptual view of the processing stages of an image in an embodiment of the present invention.

Within each row of pixels, neighboring pixels having the same pixel tags are grouped into a line segment 20. FIG. 1 illustrates, by way of example, a first line segment 60 comprised of white pixels 62, a second line segment 70 comprised of black pixels 72 and a third line segment 80 comprised of white pixels 82. FIG. 1 illustrates only a portion of the width of the page 15 divided into pixels for purposes of illustration. According to an embodiment of the invention, each row of pixels extends across the width of the page 15.

Optionally, white pixel line segments not located between two or more non-white pixel line segments may be assigned an identifier of "0."

Similar to pixels, line segments also have identifiers and tags. The line segment identifier matches the known pixel identifiers of the pixels forming the line segment. Similarly, the line segment tag matches the pixel tags of the pixels forming the line segment.

One purpose of dividing the sample image 10 into line segments 20 is to provide for the processing of portions of the sample image 10, and other surrounding images or borders, to allow for the determination of windows within the document. Each line segment constitutes a portion of the content in the window formed of a continuous array of pixels. Typically, an entire page will be processed, including white background pixels. It is understood that a page of a document will typically be divided into pixels on a row-by-row basis during processing.

As used herein, "image" means a portion of a page, or all of a page, of a document. An image may include text, graphics, white space or other types of printed matter content.

As used herein, "window" means a portion of a document identified during processing as having substantially uniform characteristics suitable for similar processing.

Figure 2:
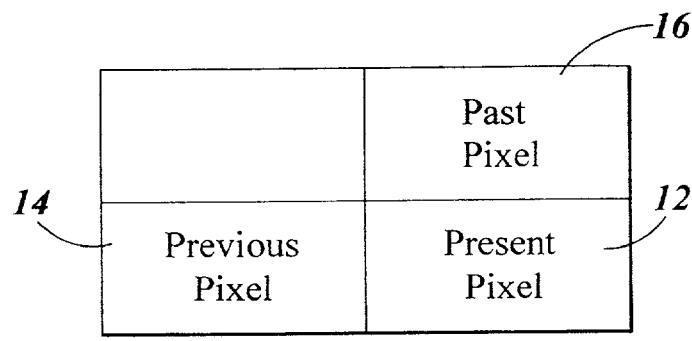
FIGS. 2 and 3 provide illustrations of the definitions used in the description of the present invention related to pixels and line segments.
Figure 3:
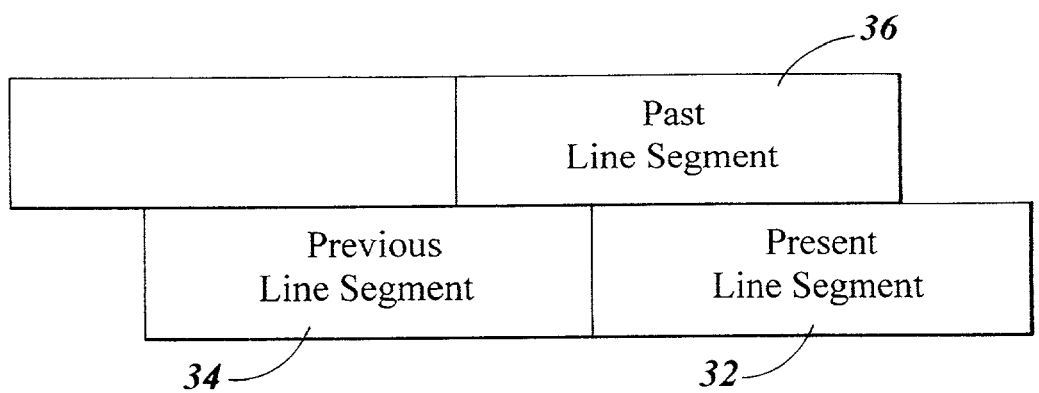

For ease of illustration, FIG. 2 illustrates the pixel naming convention used herein. The pixel to the left of the "present pixel" 12, i.e. the pixel currently being processed, is the "previous pixel" 14, while the pixel above the pixel currently being processed is the "past pixel" 16. Similarly, FIG. 3 shows the naming convention used herein for line segments, including a present line segment 32, a previous line segment 34 and a past line segment 36.

Figure 4:
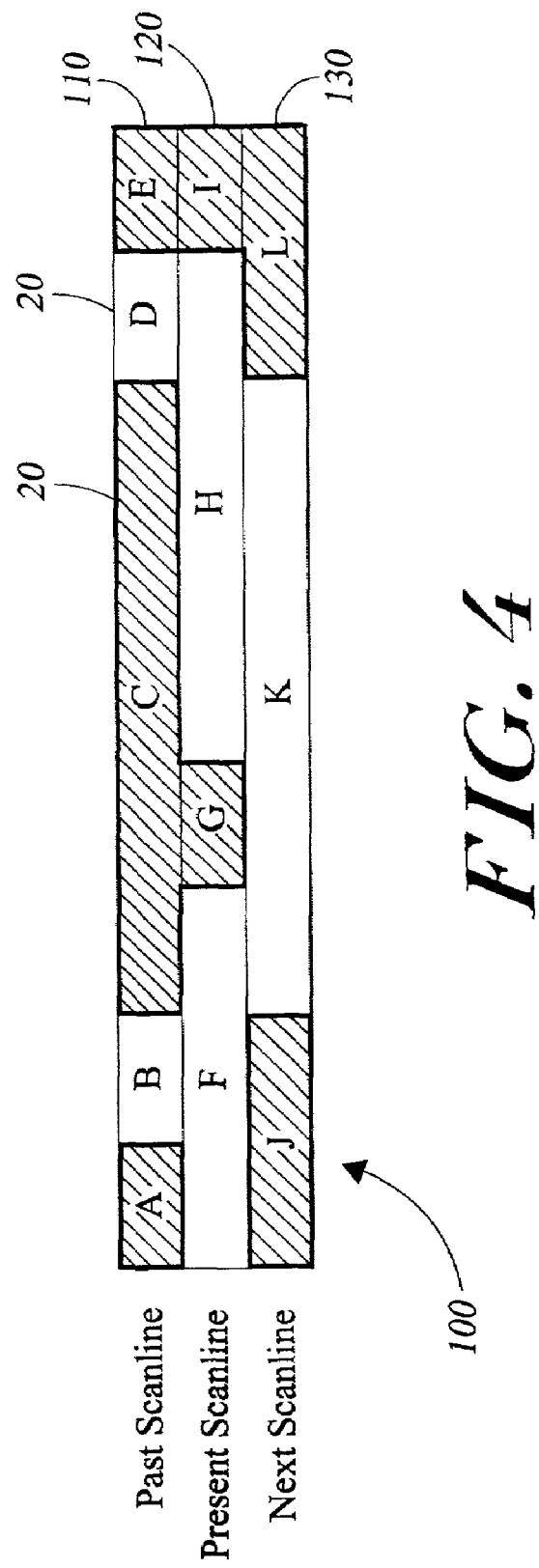
FIG. 4 provides an illustration of the image and the unique identifier for each of the line segments contained therein.

For purposes of illustration, FIG. 4 shows an image 100 formed of a plurality of line segments 20. The line segments 20 of FIG. 4 denote both white and non-white portions of the image 100. For ease of discussion, the three rows of the image 100 are labeled past scan line 110, present scan line 120 and next scan line 130. As processing of an image proceeds, each of the scan lines are moved down the page. Therefore, any series of rows of pixels on the page may be described as a next scan line 130, a present scan line 120 and a past scan line 110, preferably in that order. For clarity of the description herein, the scan line labels of the example are not moved to refer to different scan lines during processing. However, during the processing of a page, the scan line labels are moved.

Figure 5:
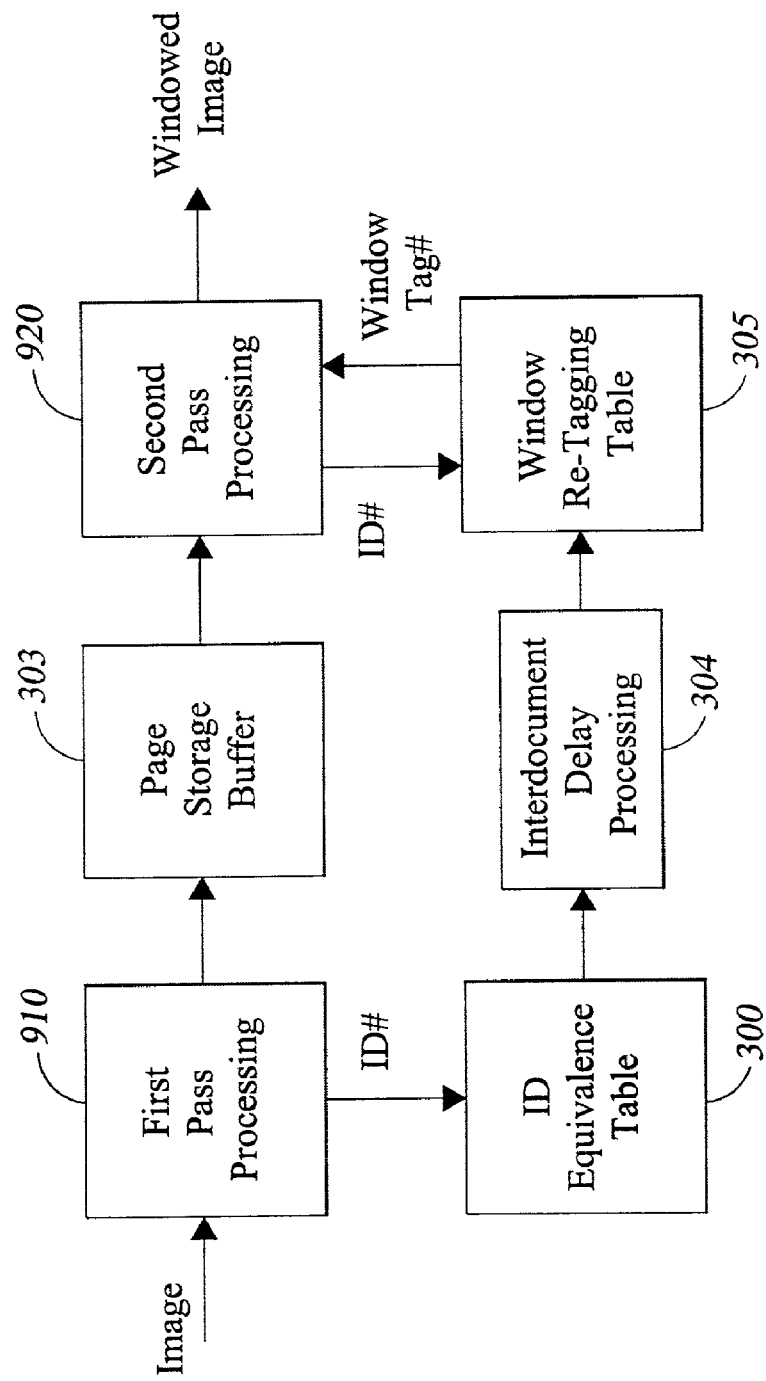
FIG. 5 is a functional schematic according to an illustrative embodiment of the present invention.

According to an illustrative embodiment of the invention, the image 100 is processed according to the method of FIG. 5. First pass processing 910 is performed as described below and in accordance with the methods of FIGS. 6 and 10. FIGS. 7A-7F further illustrate aspects of the first pass processing 910 of the past scan line 110 and present scan line 120 of FIG. 4. According to the illustrative embodiment, the first row of pixels of a page is processed differently from subsequent pixel rows and will now be discussed. In the present example, the processing of the first row of pixels of a page 15 will be discussed in relation to the past scan line 110 as shown in FIG. 7A.

The first row of pixels is processed on a pixel-by-pixel basis. A pixel tag of each pixel is read and line segment borders are determined at each change of a pixel tag from a previous pixel to a present pixel, see FIG. 2. Each line segment is assigned a line segment tag and a unique identifier.

Figure 7A:
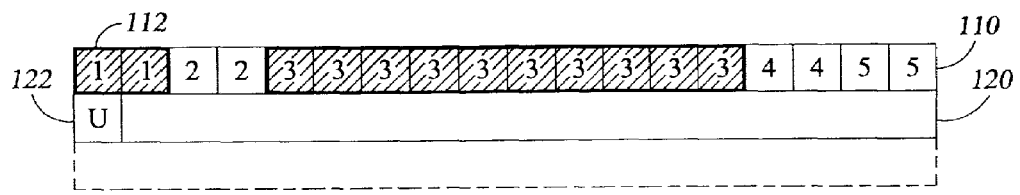
FIGS. 7A-7F provide illustrations of the allocations of pixel identifiers during first pass processing.
Figure 7B:
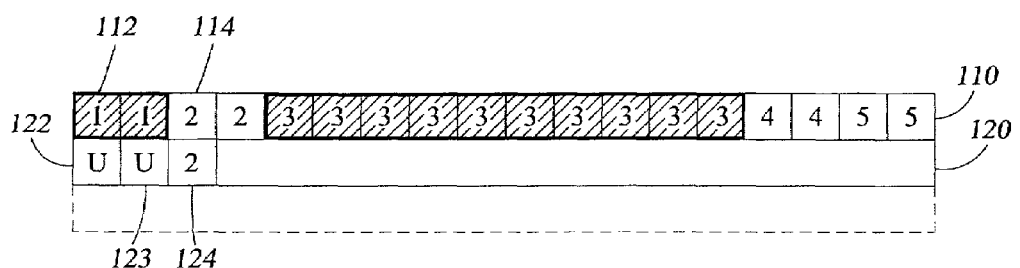
Figure 7C:
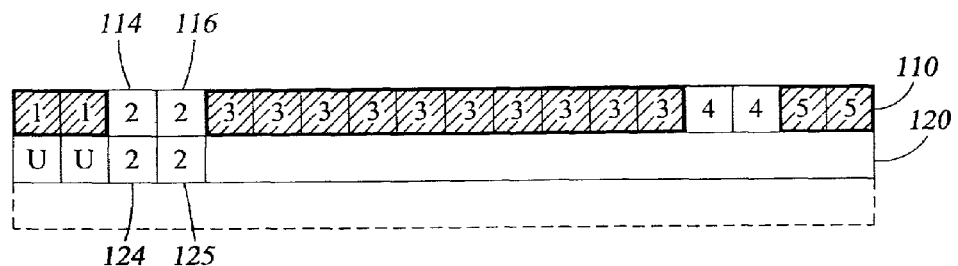
Figure 8:
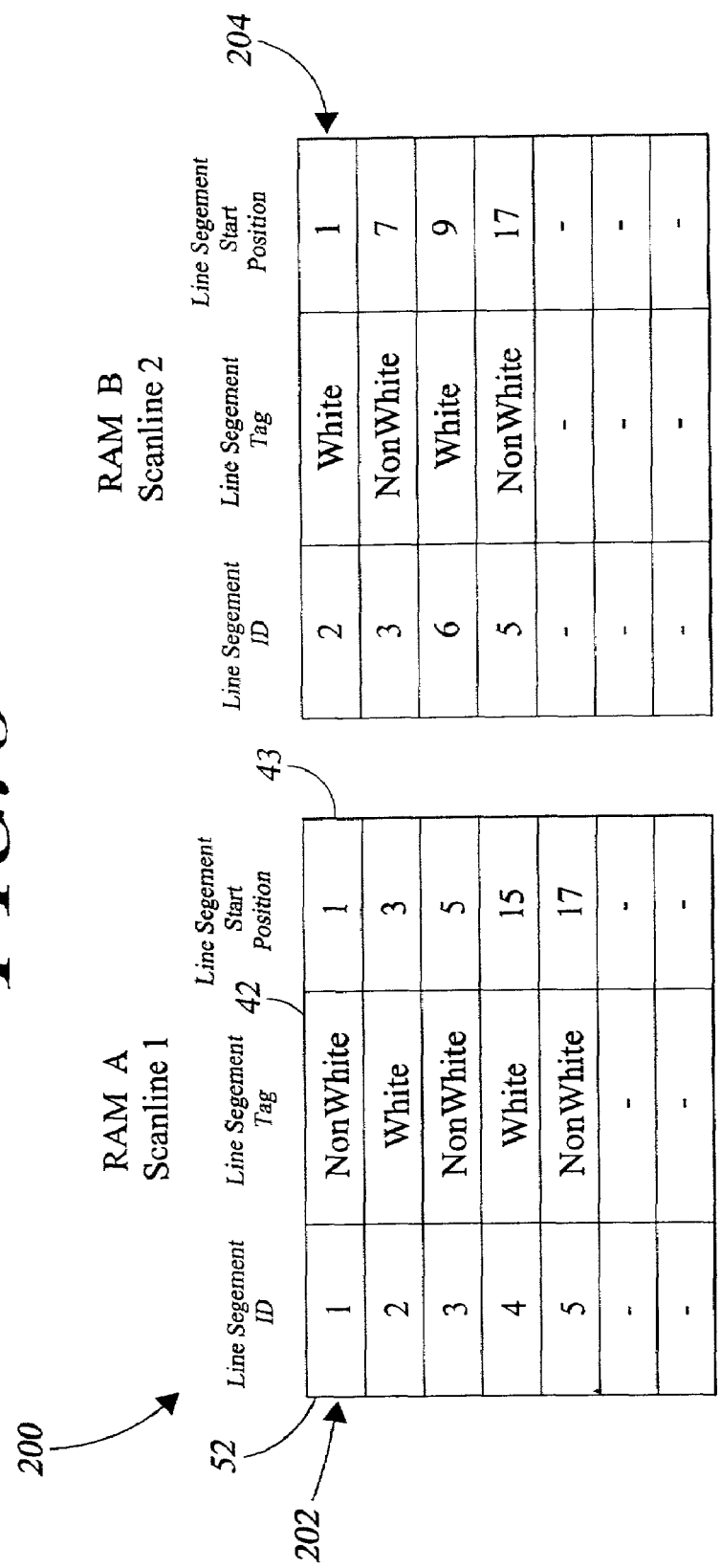
FIG. 8 provides an illustration of a line segment memory.

For example, as shown in FIG. 7A, the left-most pixel of the past scan line 110 is determined to be a non-white pixel. Similarly, the next pixel to the right is also a non-white pixel. Upon reading the pixel tag of the third pixel, now the present pixel, of the past scan line 110, the previous pixel tag differs from the present pixel tag. Therefore, a first segment tag 42 matching the pixel tag common to the pixels forming the first line segment A, shown in FIG. 8, is assigned to the first line segment A. See FIGS. 4 and 7A. In the present example, the first segment tag 42 indicates that the first line segment A is a non-white line segment.

A first segment identifier 52, such as "1", is also assigned to the line segment A and written to a first memory location 202 of a line segment memory 200, see FIG. 8. The line segment memory 200 also includes the first segment tag 42. Optionally, the line segment memory 200 includes additional segment data such as the overall length of the first line segment A or a start position of the line segment 43. Line segment length or start position may be indicated by the number of pixels in the line segment or by specifying a length in another unit of measurement.

Preferably, the line segment memory 200 is a ping-pong memory that can be repeatedly written to, such as a ping-pong random access memory (RAM). The ping-pong feature of the preferred memory eliminates the need for rewriting line segment data. For example, one side of the ping-pong RAM, RAM A in FIG. 8, contains line segment data for the past scan line 110. Upon processing of the present scan line 120, line segment data can be written to the other side of the ping-pong RAM, RAM B shown in FIG. 8. Upon processing of the next scan line 130, line segment data for the next scan line 130 would be written in RAM A. Therefore, the ping-pong RAM would always contain line segment data for the required rows of pixels during processing, without need for rewriting data or shifting data.

Figure 9:
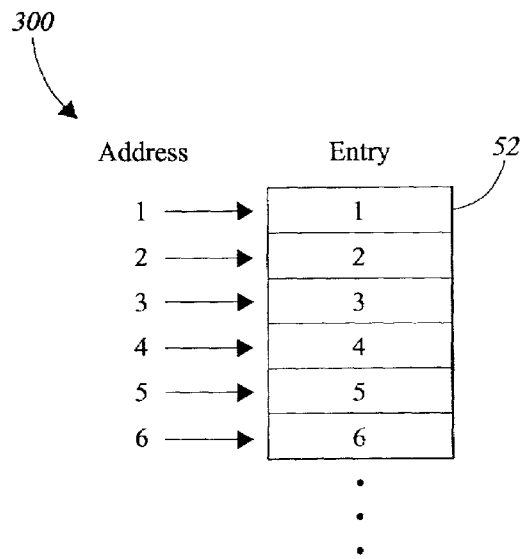
FIG. 9 provides an illustration of an identification number equivalence table.

The first identifier 52 is also written to an identification number equivalence table 300, shown in FIG. 9. Initially, a new identification number is written to a new memory location. Identifiers may be any type of letter, number, symbol or combination thereof that would provide for the ability to distinguish identifiers from each other. Processing of the past scan line 110 continues until the end of the past scan line 110 is reached.

As shown in FIG. 5, the identification number equivalence table 300 and a page storage buffer 303 are used to store the output of the first pass processing 910. Preferably included in the page storage buffer 303 is the graphical representation of the image. Preferably, pixel tags or line segment tags are also stored in the page storage buffer 303.

Figure 6:
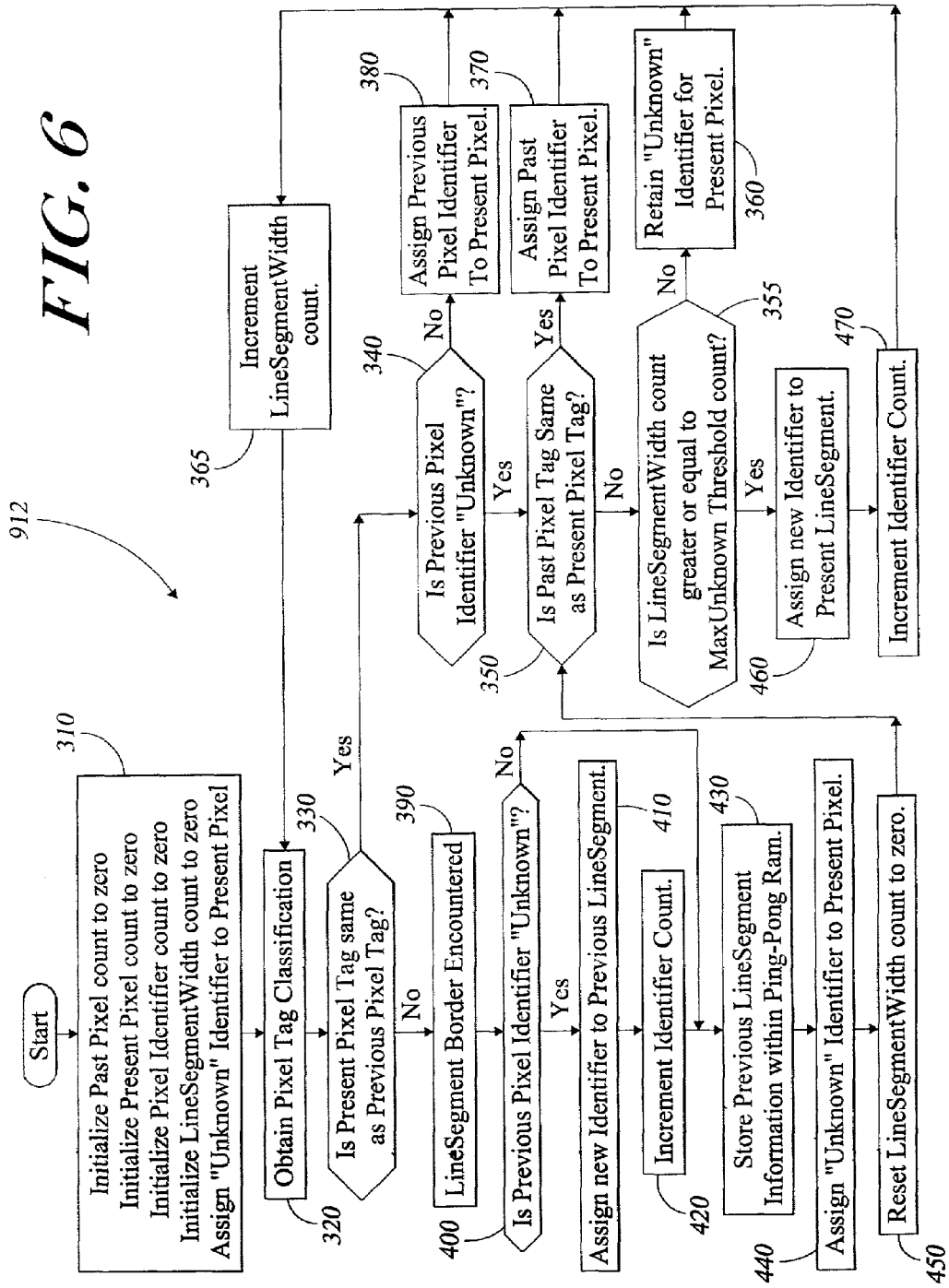
FIG. 6 is a method of line segment identifier allocation during the first pass processing according to an illustrative embodiment of the present invention.
Figure 10:
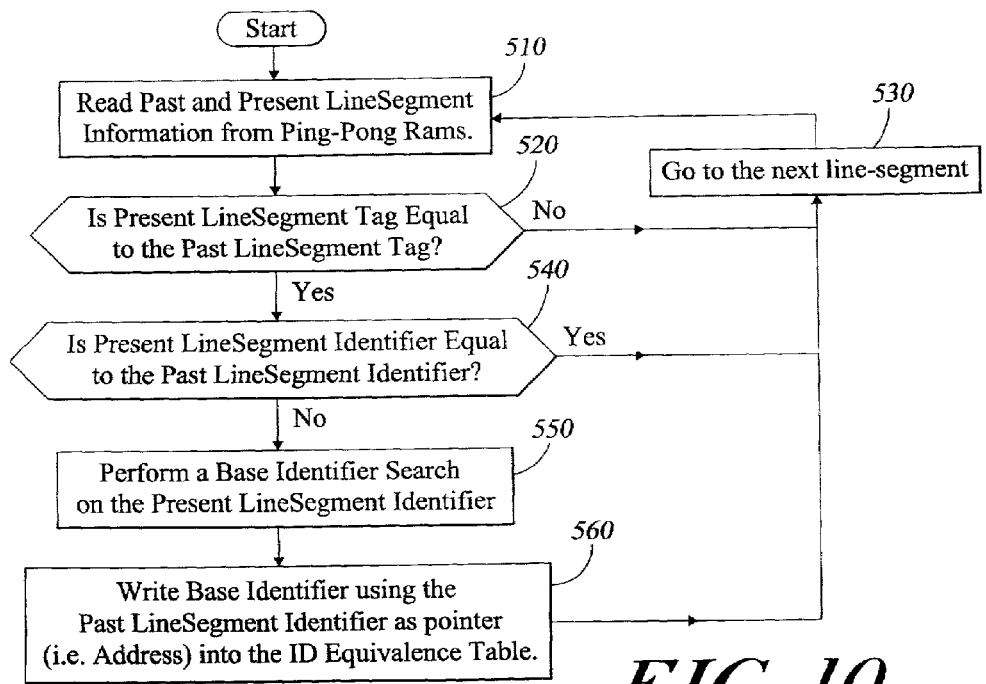
FIG. 10 provides an illustration of a method for updating the identification number equivalence table during the first pass processing according to an illustrative embodiment of the present invention.

According to the present embodiment, processing of the remainder of the page 15 and image 100 is conducted in accordance with the methods of FIGS. 6 and 10. Optionally, every row of pixels of each page 15, after the first page of a document, may be processed according to the method of FIG. 6.

In the first stage of processing, step 310, the past pixel count, the present pixel count, the pixel identifier count and the line segment width count are each set to zero. The present pixel identifier is also set to "unknown." The pixel tag of the left-most pixel 122 of the present scan line 120 is then obtained, step 320. See FIG. 7A. The present pixel tag is then compared to the previous pixel tag in step 330.

In the event the present pixel is the first pixel of the row of pixels, as is the case with the left-most pixel 122, the present pixel tag is considered to be the same as the previous pixel tag in step 330 of the method shown in FIG. 6. Therefore, the previous pixel identifier is examined to determine if it is "unknown", step 340. In the present example, the left-most pixel 122, i.e. currently the present pixel, does not have a corresponding previous pixel because there is no pixel to its left. Therefore, in this case, the previous pixel has an "unknown" identifier.

The past pixel tag is therefore compared to the present pixel tag, step 350. In the present example, the past pixel is the left-most pixel 112 of the past scan line 110. The past pixel tag in the present example represents a non-white pixel while the present pixel tag is a "white" pixel tag.

Therefore, in the present example, processing continues with step 355, determining whether the line segment width count is greater or equal to the maximum unknown threshold count. The maximum unknown threshold count is designed to allow for a buffer memory to be used as described later in relation to second pass processing. In the present example, an artificially low maximum unknown threshold count is set to 6. However, the maximum unknown threshold count is typically set to a larger value corresponding to the memory addresses available in a buffer memory, such as 32 or 256 or higher.

Because the line segment width count does not equal or exceed the maximum unknown threshold count, the unknown identifier is retained for the present pixel, step 360. Processing continues by incrementing the line segment width count, step 365.

In accordance with the method of the present embodiment shown in FIG. 6, the process repeats, beginning at step 320, for the pixel 123 to the right of the left-most pixel 122 of the present scan line 120. See FIG. 7B. Because the relevant parameters for the pixel 123 to the right of the left-most pixel 122 of the present scan line 120 are the same as for the left-most pixel 122, the processing of the pixel 123 to the right of the left-most pixel 122 would be the same as for the left-most pixel 122 as described above.

Processing of the third pixel 124 from the left of the present scan line 120 is the same as the above-described process until the past pixel tag is compared to the present pixel tag in step 350. In this case, the past pixel tag, here corresponding to the third pixel 114 from the left in the past scan line 110, is "white," therefore matching the third pixel 124 from the left in the present scan line 120. Therefore, the past pixel identifier is assigned to the present pixel, step 370. The line segment width count is again incremented, step 365.

The process again repeats beginning at step 320 for the fourth pixel 126 from the left on the present scan line 120. See FIG. 7C. In this case, the previous pixel identifier is known, step 340. The previous pixel identifier in this case is "2," the pixel identifier of the fourth pixel 125 from the left of the present scan line 120. Therefore, the previous pixel identifier is assigned to the present pixel, step 380, followed by incrementing the line segment width count, step 365.

Figure 7D:
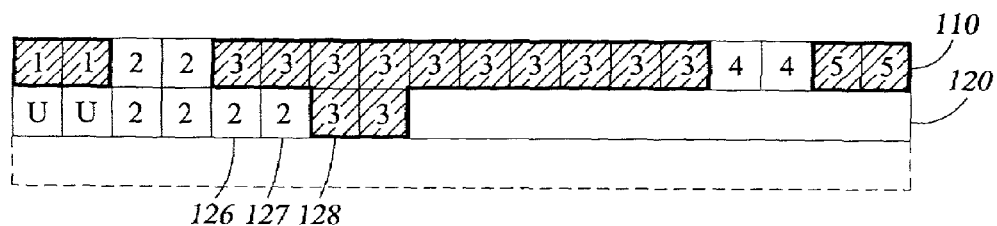

With reference to FIG. 7D, the fifth pixel 126 and sixth pixel 127 of the present scan line 120 are processed as described above in relation to the fourth pixel 125 of the present scan line 120.

Upon reaching the seventh pixel 128 from the left of the present scan line 120, the present pixel tag is compared to the previous pixel tag, step 330. Because the present pixel tag of the seventh pixel 128, representing a non-white pixel, is not the same as the previous pixel tag, representing a white pixel, a line segment border is detected, step 390.

At this time in the present example, the previous pixel is the sixth pixel 127 from the left of the present scan line 120 and its identifier is 2, as shown in FIG. 7D. Therefore, because the previous pixel identifier is known, step 400, processing proceeds to step 430. The previous line segment data is stored to the line segment memory 200, step 430, with a line segment identifier equal to the pixel identifiers of the pixels forming the line segment. In the present case, the previous line segment "F" as shown in FIG. 4, including the first pixel 122 to the sixth pixel 127 from the left of the present scan line 120, is assigned a line segment identifier of "2". Therefore, "2" is stored to the line segment memory 200, step 430.

Because this is the first line segment data of a new scan line, the line segment data is stored in the opposite side from the earlier scan line. In this case, the line segment data of the past scan line 110 was stored in RAM A, so the line segment data of the present scan line 120 is stored in RAM B, as shown in FIG. 8. The line segment data for line segment "F" is shown in row 204.

Next, the present pixel is assigned an unknown pixel identifier, step 440, and the line segment width count is set to zero, step 450. Processing continues at step 350, as shown in FIG. 6. Because the past pixel, here the seventh pixel 118 from the left of the past scan line 110, has a "non-white" pixel tag and the present pixel tag is also "non-white," the present pixel is assigned the past pixel identifier, step 370. In this case, the present pixel identifier is "3", as shown in FIG. 7D. By the use of the ping-pong memory for the line segment memory 200, the past pixel information, such as the past pixel tag and past pixel identifier can be quickly determined.

Figure 7E:
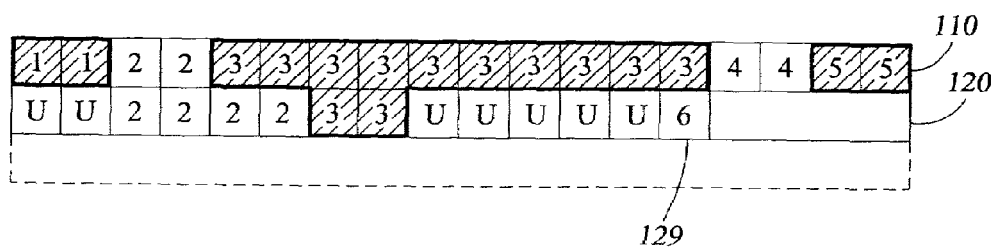

The remaining pixels of the present scan line 120 until the fourteenth pixel 129 from the left, see FIG. 7E. As noted above, for the purposes of this example the maximum unknown threshold count is set to 6. Therefore, at step 355, the line segment width count is greater or equal to the maximum unknown threshold count. Therefore, a new segment identifier, "6" in this case, is assigned to the present line segment, step 460. Also, the identifier count is incremented, step 470, and the line segment width count is incremented, step 365.

Figure 7F:
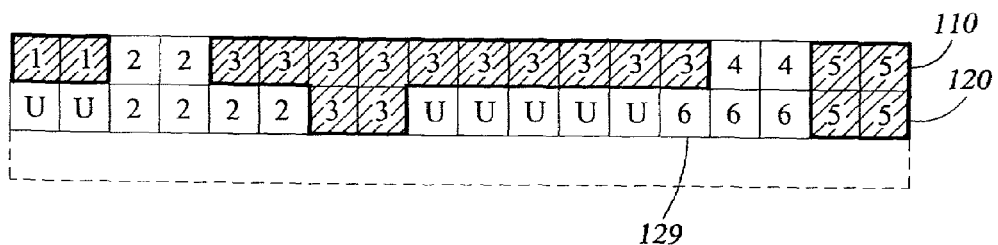

The remaining pixels of the present scan line 120 are processed according to the method described above. For reference, FIG. 7F provides the pixel identifiers assigned to the pixels of the remainder of the present scan line 120 according to the method of FIG. 6.

The method of FIG. 6 during the first pass processing 910 proceeds until the end of the scan line. With reference to FIGS. 11A and 11B, first pass processing 910 includes line segment identifier allocation 912 and updating 914 the identification number equivalence table 300. In the illustrative embodiment of the invention, line segment identifier allocation 912 is provided by the method of FIG. 6 and updating 914 the identification number equivalence table 300 by the method of FIG. 10. Preferably, line segment identifier allocation 912 is performed on the first two scan lines of a page or document before updating 914 the identification number equivalence table 300.

As shown in FIG. 11A, updating 914 the identification number equivalence table 300 may be performed between each scan line. Alternatively, as shown in FIG. 11B, line segment identifier allocation 912 may be performed only every other scan line so that updating 914 the identification number equivalence table 300 may be performed on alternate scan lines. Although performing line segment identifier allocation 912 on only every other scan line reduces the resolution of the resulting windowing of the document, modem day scanner resolutions are sufficiently detailed to enable a reduction in windowing resolution with acceptable results.

Figure 13A:
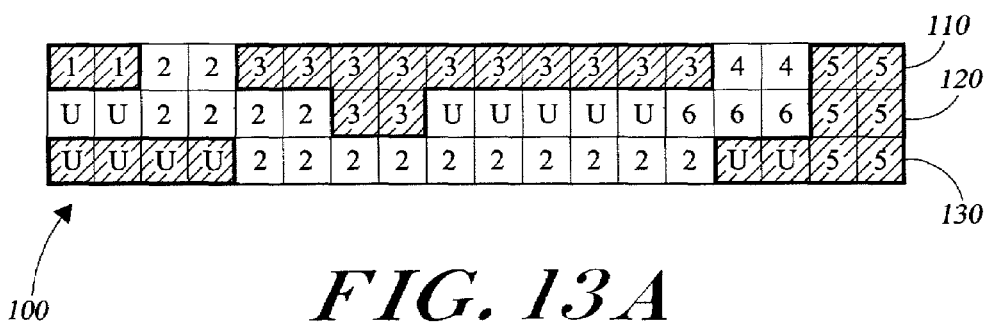
FIG. 13A illustrates the assignment of pixel identifiers at the conclusion of first pass processing.
Figure 13B:
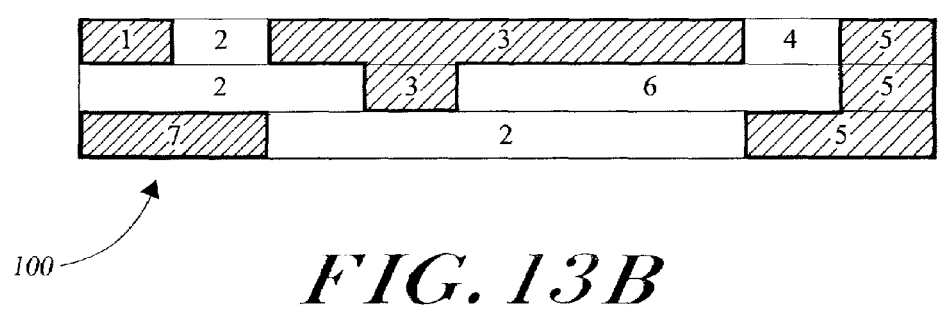
FIG. 13B provides an illustration of line segment identifiers at the conclusion of first pass processing.

FIG. 13A provides an illustration of the pixel identifiers assigned during the line segment identifier allocation 912 as provided by the method of FIG. 6. With reference to FIGS. 4, 6 and 13A, it is noted that after processing the pixels of line segment "J," the previous pixel identifier is unknown in step 400, so a new line segment identifier is assigned to the previous line segment, step 410. In this case, the line segment identifier assigned to line segment J is "7," as illustrated in FIG. 13B. Next, the identifier count is incremented, step 420. FIG. 13B illustrates the line segment identifiers assigned during the line segment identifier allocation 912 as provided by the method of FIG. 6.

Updating 914 the identification number equivalence table 300 will be explained herein with reference to the lower two scan lines as illustrated in FIGS. 4, 13A and 13B, in order to better illustrate the illustrative embodiment of the invention. In keeping with the nomenclature illustrated in FIG. 3, lines segments in the bottom-most scan line of FIGS. 4, 13A and 13B are progressively identified as present line segments.

As illustrated in FIG. 10, updating 914 the identification number equivalence table 300 begins with reading line segment data from the line segment memory 200, step 510. With reference to FIGS. 3, 4, 10, 13B and 14, the line segment data of the past line segment, line segment "F" in this case, is read from the line segment memory 200, step 510. Line segment data for line segment "F" is contained in the first row 204 of RAM B of the line segment memory 200 as illustrated in FIG. 14. Similarly, line segment data for the present line segment, line segment "J", is read from the first row 202 of RAM A of the line segment memory 200. Next, the present line segment tag is compared to the past line segment tag, step 520. In this case, the present line segment tag indicates a non-white line segment as illustrated in FIGS. 13B and 14. The past line segment tag in this case indicates a white line segment. Therefore, processing continues at the next line segment, step 530.

Processing repeats at step 510 by reading the appropriate line segment data from the line segment memory 200. In this case, as illustrated in FIG. 14, the line segment data corresponding to line segment "K" is read from the second row 206 of RAM A of the line segment memory 200. In this case, the present line segment tag is equal to the past line segment tag, step 520, as both are "white" line segment tags. Therefore, as shown in FIG. 10, processing continues by a comparison of the present line segment identifier to the past line segment identifier, step 540. In the present case, the present line segment identifier, as illustrated in FIGS. 13B and 14 is equal to the past line segment identifier, as each line segment identifier is "2". Therefore as illustrated in the method of FIG. 10, processing proceeds to the next line segment, step 530.

The determination of the appropriate next line segment in the method of FIG. 10 is accomplished by locating the next available, neighboring line segment above or below one of the previously processed line segments. For example, line segment "G" is the next available neighboring line segment to a previously processed line segment. See FIGS. 4 and 13B. If there is no such neighboring line segment above or below a previously processed line segment and the ends of the scan lines have not been reached, the next available line segment lower of the two scan lines being processed will be the present scan line for the purposes of the method of FIG. 10.

Processing continues by the reading of the appropriate line segment data, step 510, and the present line segment tag is compared to the past line segment tag, step 520. In the present case, the present line segment tag of line segment "K" does not equal the past line segment tag of line segment "G", as one line segment is a white line segment and the other is a non-white line segment. Processing then proceeds to the next line segment, step 530.

Beginning again through steps 510 and 520, the present line segment tag is equal to the past line segment tag, step 520, so processing continues by the comparing of the present line segment identifier to the past line segment identifier, step 540. In this case, the present line segment identifier of line segment "K" is "2" and the line segment identifier of the past line segment "H" is "6". Because the line segment identifiers are not equal, the processing continues with a base identifier search on the present line segment identifier, step 550.

A base identifier search involves searching through the identification number equivalence table 300 to find the base identifier of contiguous line segments having matching segment tags. This is performed by searching through the memory locations of the identification number equivalence table 300, using the contents of each memory location as a pointer to a further memory location until a base identifier is found. A base identifier is signified by the contents of a memory location containing a pointer that points to its own memory location.

A base identifier search of the present line segment is performed by looking to the memory location corresponding to the present line segment. The content of that memory location is then used as a pointer to a memory location. This process continues until a pointer points to its own memory location. For example, in the present case, the memory location corresponding to the present line segment "K" is memory location "2." As shown in FIG. 12, the content of memory location "2" is "2." Therefore, the base identifier search is complete, with the base identifier of the present line segment being "2."

Figure 15:
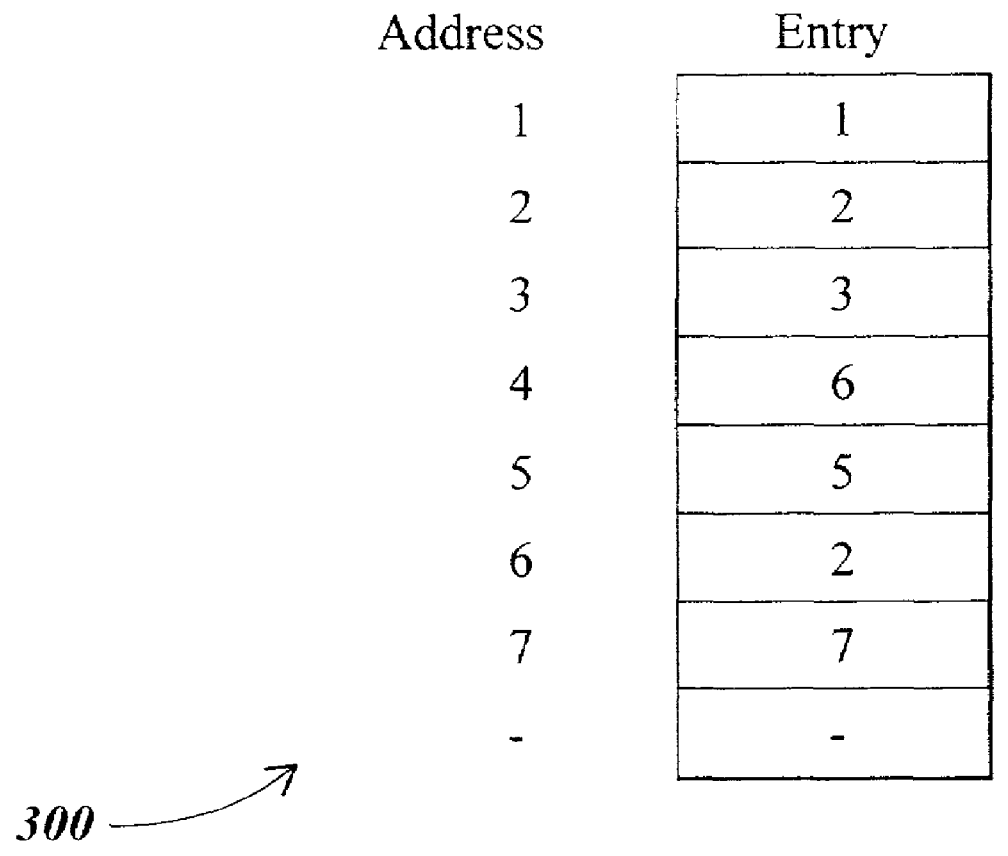

Next, the base identifier of the present line segment is written to the memory location in the identification number equivalence table 300 specified by using the past line segment identifier as a pointer, step 560. In the present case, the past line segment "H" has an identifier of "6." See FIGS. 4 and 13B. Therefore, the base identifier "2" is written to the sixth memory location of the identification number equivalence table 300, as shown in FIG. 15. Note that the line segment identifiers assigned to each line segment, as illustrated in FIG. 13B do not change. Instead, the identification number equivalence table 300 is used to associate the line segments.

Optionally, the base identifier search may be omitted for line segments having various segment tags, such as for white pixel line segments.

Figure 12:
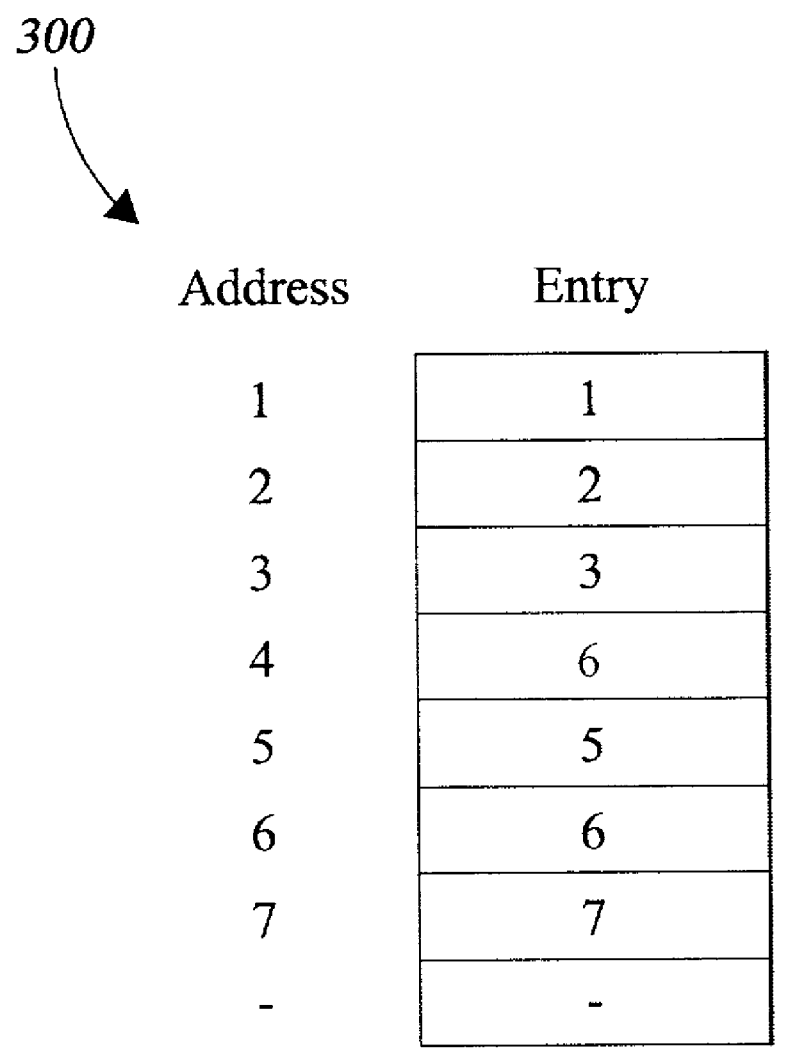

With reference to FIGS. 9, 12 and 15, it is noted that the content of the fourth memory location of the identification number equivalence table 300 was updated from "4" to "6" upon an earlier operation of the method of FIG. 10 after processing of the first two lines of FIG. 13B in view of line segments D and H.

Updating 914 the identification number equivalence table 300 of the remainder of the present scan line 120 and next scan line 130 continues as described above for the remaining line segments. Then, line segment identifier allocation 912 begins for the next set of scan lines. This process of alternating between line segment identifier allocation 912 and updating 914 the identification number equivalence table 300 continues until the end of the document is reached.

First pass processing 910 as described above associates proximate line segments of neighboring scan lines. However, the first pass processing of the illustrative embodiment uses only a two-line line segment memory 200 and therefore does not associate line segments beyond the present scan line and the past scan line at any given time. As an example, note that although line segments B, F, K H and D are proximate and of common content type, all of these line segments do not yet have a common identifier. See FIGS. 4, 13B and 15. Optionally, line segment memories having greater line capacity may be used in accordance with a variation of the present invention.

Figure 16:
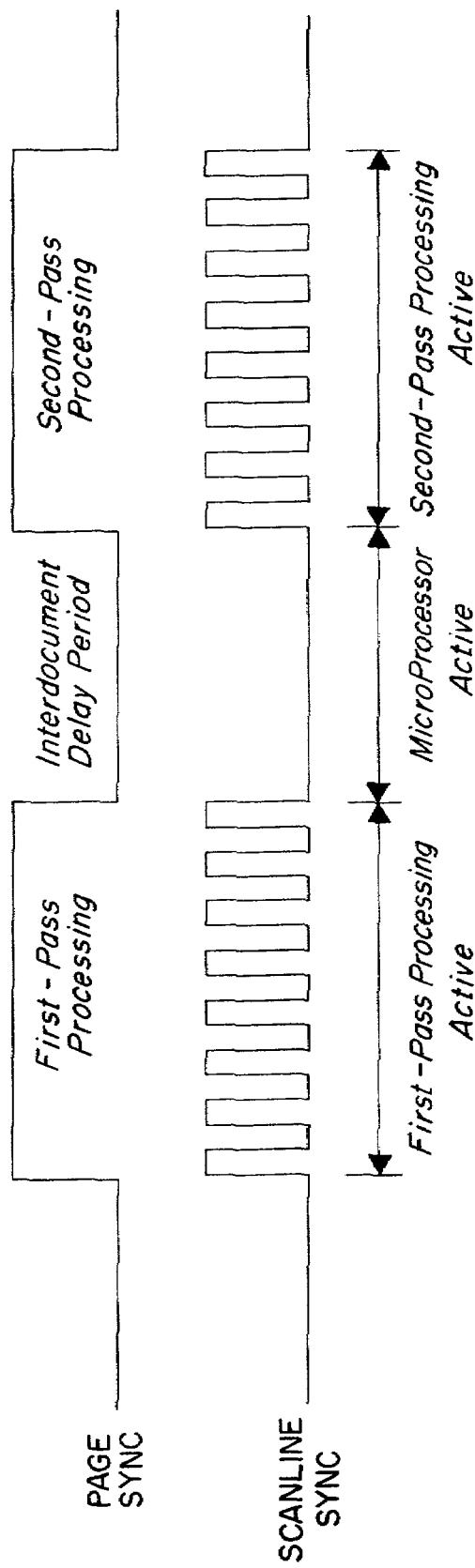
FIG. 16 provides a timing diagram for the relationship between first pass processing, interdocument delay processing and second pass processing.

With reference to FIGS. 5 and 16, processing continues with interdocument delay processing 304 to perform further analysis of the identification number equivalence table 300 during an interdocument delay period. The interdocument delay period may occur between pages, at the end of a document or at other specified intervals.

Figure 17:
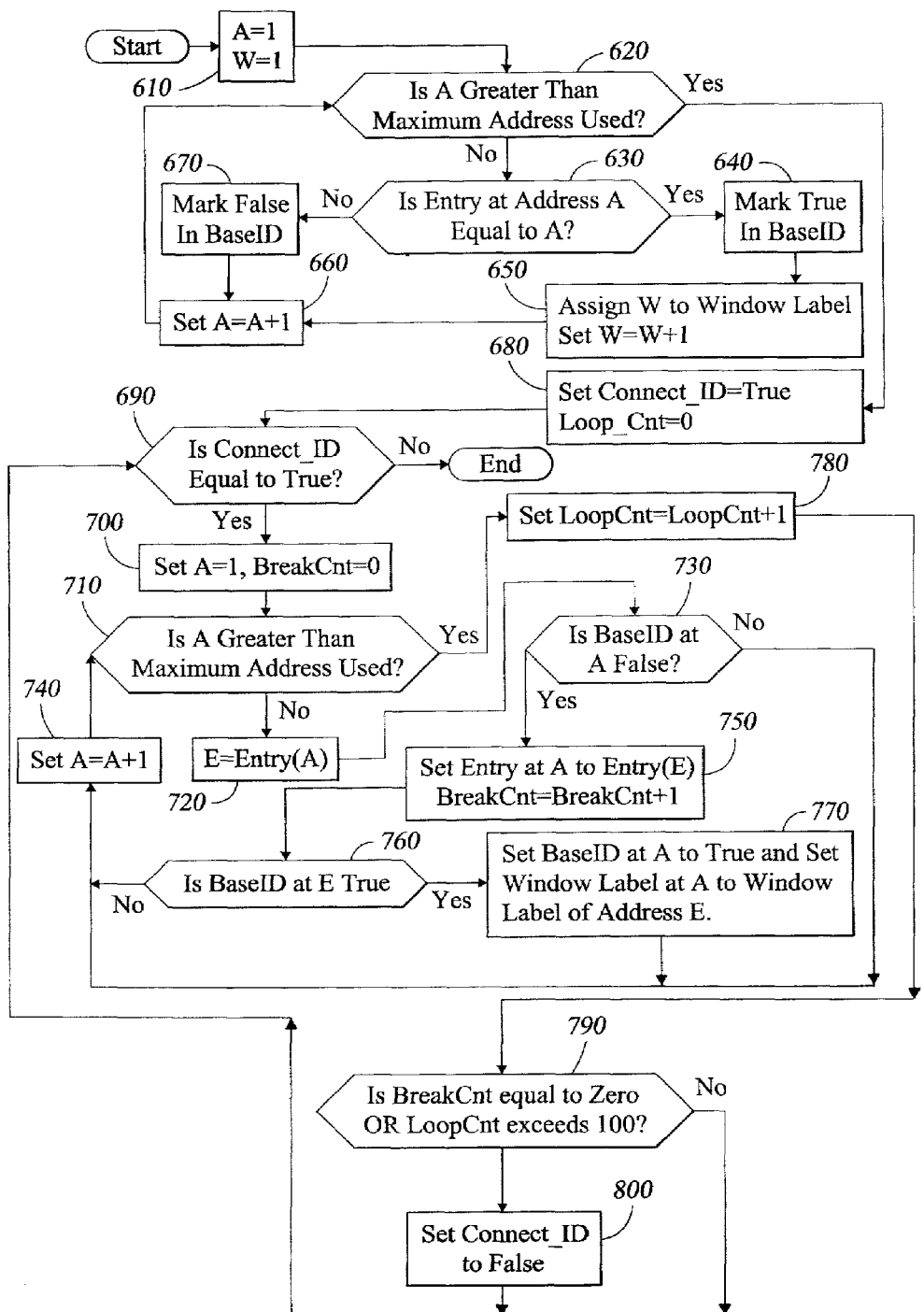
FIG. 17 provides a method for interdocument delay processing according to an illustrative embodiment of the present invention.

According to an illustrative embodiment of the invention, the interdocument delay processing 304 involves the method illustrated in FIG. 17 to reduce all memory address contents to their base identifier, producing a window retagging table 305 for use in second pass processing 920. Therefore, interdocument delay processing 304 as described below overcomes the shortcomings of the two-line line segment memory 200.

According to an illustrative embodiment of the invention, the interdocument delay period begins by setting variables A and W equal to "1", step 610. The variable A is then compared to the maximum address used, step 620. As provided in the identification number equivalence table 300 at the conclusion of first pass processing 910, as illustrated in FIG. 15, the maximum address used in this case is 7. Because A is not greater than the maximum address used, processing continues by comparing the entry at address A to A, step 630. A=1, and as illustrated in FIG. 15, the entry for address 1 is "1."

Preferably, the interdocument delay processing 304 involves a status table 302. The status table 302 contains three items for each memory location. First, an entry 307 is provided matching the contents of the corresponding memory location in the identification number equivalence table 300 at the conclusion of first pass processing 910. A BaseID flag 308 is also determined as described herein. Also, a window label 309 is determined, identifying the window to which line segments associated with the memory location are included.

Because, at this stage in the present example, the entry at address A is equal to A, processing continues by marking the BaseID flag 308 as "True" for the current memory location, step 640, identified by Address 1, see FIG. 18A. Processing continues by assigning the value of W to the window label 309 for the current memory location, step 650. A is then incremented, step 660, and the process begins again at step 620.

As shown in FIG. 18A, processing for the second and third memory locations is as described above. Processing for the fourth memory location differs in that, at step 630, the entry 307 of the fourth memory location is not 4. Therefore, the BaseID flag 308 is set to "False," step 670. In such a case, a window label is not assigned at this stage. Processing continues by incrementing A, step 660, as shown in FIG. 17.

When the status table 302 has been processed, FIG. 18A illustrates the resulting status table 302 in the present example. At this stage, A will be greater than the maximum address used, step 620, so the Connect_ID flag will be set to "True" and a loop counter set to zero, step 680.

The remainder of the interdocument delay processing will work to fill in the widow labels 309 that were not provided earlier. In summary, the status table 320 is repeatedly scanned until the Connect_ID flag is set to "False." Before each scan, the A is set to 1 and a second counter, BreakCnt, is set to zero. At each memory location A, the entry 307 of memory location A is represented by E. If the BaseID flag 308 at memory location A is False, then the entry 307 at memory location A is changed to the entry 307 at memory location E. The BaseID flag 308 is set to True, if it is True for memory location E. BreakCnt is also incremented to account for the change.

Specifically, with reference to FIG. 17, processing continues from step 680 above by determining whether Connect_ID is true, step 690. In the present example, Connect_ID is true, so processing proceeds to set A=1 and BreakCnt=0, step 700. Step 710 determined whether A is greater than the maximum address used, step 710. At this stage A=1 and the maximum address used is 7, so processing continues by setting the variable E equal to the entry 307 of memory location A, step 720. Because the BaseID flag 308 of memory location A is not False, step 730, processing continues by incrementing A, step 740, and returning to step 710.

Processing for the second and third memory locations is as described above. Processing for the fourth memory location differs in that, at step 730, the BaseID flag 308 of the fourth memory location is False, as shown in FIG. 18A. Therefore, the entry 307 of memory location A is set to the entry 307 of memory location E and BreakCnt in incremented, step 750. At the present stage of the present example, A=4 and E=6. The entry 307 of the sixth memory location is "2," so the entry 307 of the fourth memory location is set to "2," as shown in FIG. 18B. Because the BaseID flag 308 at memory location E is not True, step 760, as shown in FIG. 18A, processing continues by returning to step 740 and incrementing A.

Processing for the fifth memory location is as described above in relation to the first memory location. However, the sixth memory location has a BaseID flag 308 set to False. Therefore, at step 730, the entry 307 of memory location A is set to the entry 307 of memory location E and BreakCnt in incremented, step 750, as described above in relation to the fourth memory location. At the present stage, A=6 and E=2 and the BaseID flag 308 of the second memory location is True. Therefore, processing proceeds to set the BaseID flag 308 at memory location A to True, step 770. Also in step 770, the window label 309 for memory location A is set to correspond to E, in this case, because E=2, the window label 309 for memory location A is set to "W2."

The remaining memory locations are processed as described above. FIG. 18B shows the content of the status table 320 after one iteration of proceeding through each memory location. After processing each memory location, A is greater than the maximum address used, step 710, so processing continues by incrementing the loop counter, LoopCnt, step 780. BreakCnt is then compared to zero and LoopCnt is compared to a limit, such as 100, step 790. BreakCnt is not zero at the present stage, indicating that at least one entry 307 was modified during the most recent iteration. LoopCnt is set to a high number to limit the processing time. Although a value of 100 is used herein, the value may be adjusted as desired.

Because BreakCnt is not equal to zero, processing returns to step 690 to begin the next iteration of processing the status table 302.

Figure 18C:
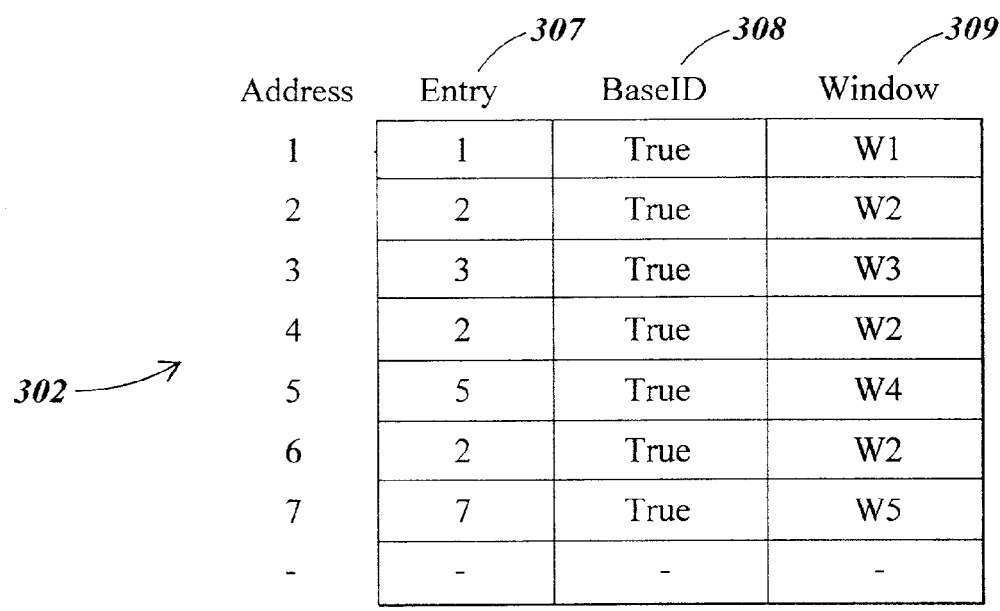

At the conclusion of the next iteration, the status table 302 is as shown in FIG. 18C. After the third iteration, all the BaseID flags 308 are True and the counter BreakCnt remains zero, therefore, Connect_ID is set to False, step 800, and the processing then proceeds again to step 690. Because Connect_ID is False at step 690, interdocument delay processing 304 ends.

Figure 19:
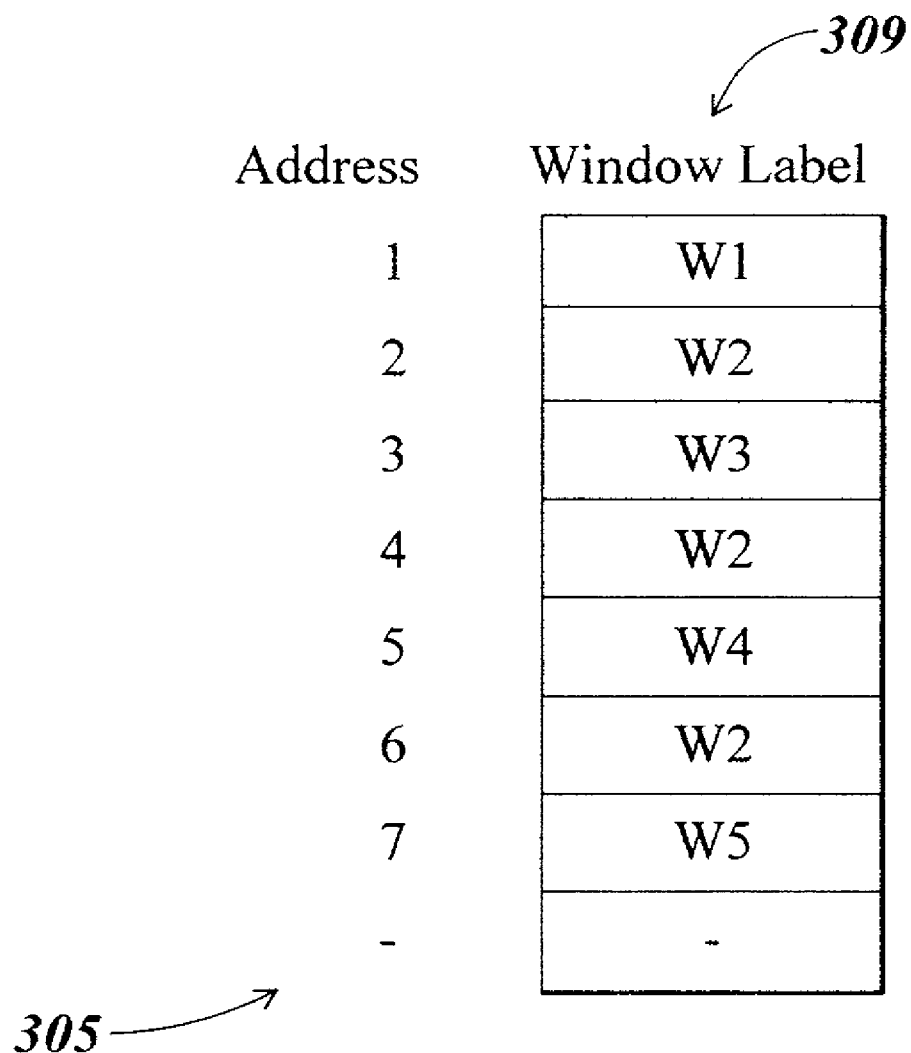
FIG. 19 illustrates a window retagging table according to an illustrative embodiment of the present invention.

The resulting window retagging table 305 is produced from the window label 309 items of the status table 302. The window retagging table 305 of the present example is shown in FIG. 19.

Figure 23:
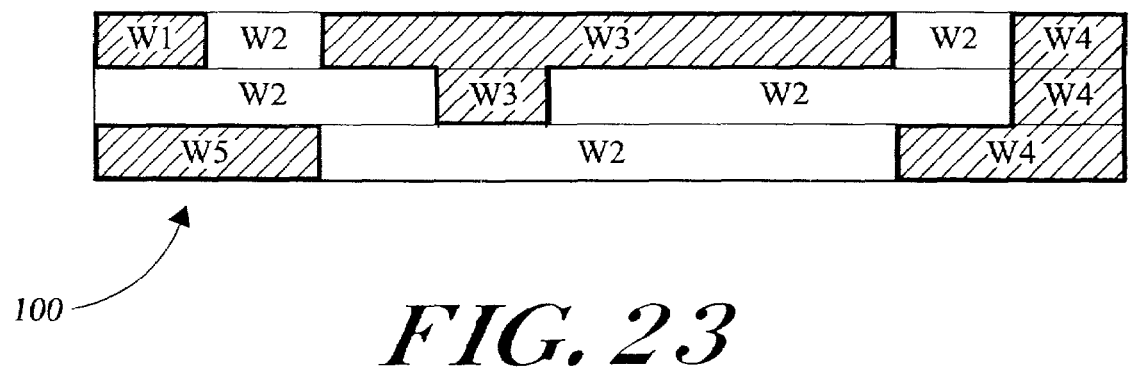
FIG. 23 provides an illustration of window labels assigned to line segments of an image according to an illustrative embodiment of the present invention.

As shown in FIGS. 4 and 23, after interdocument delay processing 304, the line segments "D" and "H" are associated with the line segments "B" "F" and "K," each of these line segments now sharing a common window label 309, thereby forming a window of common content type. In this case, this window is identified as "W2" and has a "white" content type.

Second pass processing 920 reads the image from the page storage buffer 303 to provide enhancement or alteration of the image according to the window retagging table 305. In order to avoid the need to extensive memory requirements, pixel identifiers for each pixel of the image are not stored after first pass processing 91 0 and are instead generated again by second pass processing 920. During second pass processing 920, a pixel retagging process 922 occurs to assign an appropriate final identifier to each pixel, based on the window in which the pixel is included.

It is within the scope of the invention to specify output formats for each window. For example, windows having pixel content of a particular color can be changed to a different color. Windows having a graphical picture or text may be changed to output as a white space, thereby deleting the graphical picture or text. Also, windows of white space may be provided with text or a graphical image. As another example, pixels of white and non-white groups, as in the present example, may be reversed, thereby outputting a negative image. As will be appreciated, a wide variety of alternatives are available for enhancing or altering an image within the scope of the invention.

Figure 22:
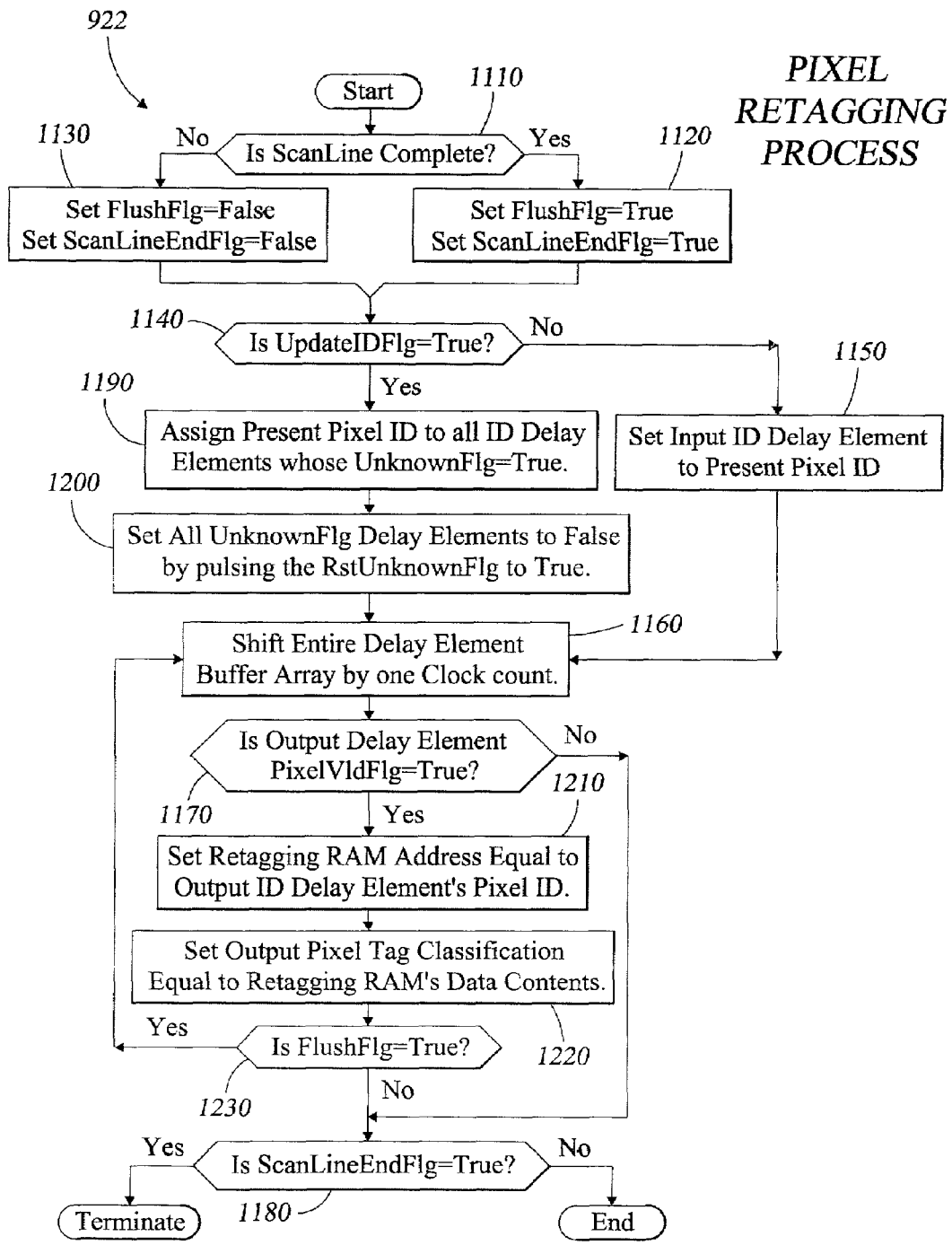
FIG. 22 provides a method of pixel retagging during second pass processing according to an illustrative embodiment of the present invention.

With reference to FIG. 5, second pass processing 920 is performed according to an illustrative embodiment of the invention by the methods of FIGS. 20 and 22. The method of FIG. 20 is similar in many respects to the method of FIG. 6 of first pass processing 910. The steps of the method illustrated in FIG. 20 are numbered with the same numbers of the method illustrated in FIG. 6.

Second pass processing 920 utilizes the graphical representation of the image stored in the page storage buffer 303 and the window retagging table 305 in order to identify each pixel of the image as it was identified during first pass processing 910. However, second pass processing 920 benefits from the window labels 309 in the window retagging table 305 to be able to associate each line segment, as it is identified, to the appropriate window. Therefore, second pass processing 920 identifies pixels, groups pixels in line segments and assigns line segment identifiers identically to first pass processing 910. Additional aspects of second pass processing 920 are involved with retagging each pixel with an appropriate designator to correspond to the window in which it is associated. Further aspects of second pass processing 920 involve managing an optional buffer memory, accommodating delays between the identification of a pixel and an assignment of a line segment identifier corresponding to that pixel. Only the steps unique to second pass processing 920 will be discussed in detail below. Steps commonly numbered to steps of first pass processing 910 are discussed in relation to first pass processing 910.

With reference to FIG. 20, second pass processing 920 begins with step 1010 in which the past pixel count, the present pixel count, the pixel identifier count and the line segment width count are each set to zero. The present pixel identifier is also set to "unknown." Furthermore, the Unknown flag and the Pixel Valid flag of the first memory location in the buffer memory are set to False. Also, the UpdateID flag is set to False. The Unknown flag, the UpdateID flag and the Pixel Valid flag are used for management of the buffer memory to modify a pixel identifier for each unknown pixel contained in the buffer before being output as a true pixel identifier, as explained below.

A sample buffer memory 1500 is illustrated in FIGS. 21A-21E. The buffer memory is preferably a first-in first-out memory register. Each memory location of the buffer memory is adapted to store a Pixel Valid flag 1510, a pixel identifier 1520 and an Unknown flag 1530.

The UpdateID flag is set to true under three conditions. The first condition occurs when the past pixel tag is the same as the present pixel tag and the previous pixel has an "unknown" identifier. In this case, all pixel identifiers within the buffer memory with an asserted Unknown flag will be modified with the identifier of the present pixel. The contents of the buffer memory are then shifted and a ResetUnknown flag is then asserted to clear all Unknown flag values.

The second condition occurs when the past pixel tag is not the same as the present pixel tag, the previous pixel has an "unknown" identifier, but the LineSegmentWidth count is greater than or equal to the MaxUnknownThreshold value, such as 6 in the present example. Once again, all pixel identifiers within the buffer memory with an asserted Unknown flag will be modified with the identifier of the present pixel. The contents within the buffer memory are then shifted and the ResetUnknown flag is then asserted to clear all Unknown flag values.

The third condition occurs when the previous pixel identifier is unknown and a line segment border is encountered. All pixel identifiers within the buffer memory with an asserted Unknown flag will be modified with the identifier of the present pixel. The contents within the buffer memory are then shifted and the ResetUnknown flag is then asserted to clear all Unknown flag values.

FIG. 22 illustrates a method of operation of the buffer memory. The method includes the "filling" and "flushing" function of the entire delay buffer before actually outputting any useful pixel identifier information. In the present example, it takes a maximum of 6 clock cycles (or pixels) to produce the first pixel identifier. Likewise, it takes 6 clock cycles at the end of a scan line to "flush" the contents of the buffer memory in order to output the last 6 pixel identifiers of the scan line. The Pixel Valid flag is used as a way to detect when the pixel identifiers of the first and last memory locations of the buffer memory are valid. (i.e. for "filling" and "flushing").

With reference to FIG. 20, processing continues after step 1010 with the pixel tag of the left-most pixel 122 of the present scan line 120 is then obtained, step 320, as in first pass processing. Because the image and the pixel tags are identical to the image and pixel tags discussed above in relation to first pass processing, and the decision steps of the first pass processing method illustrated in FIG. 6 are identical to those in FIG. 20 of second pass processing, we now proceed to step 1020.

Step 1020 involves temporarily assigning a pixel identifier to the present pixel for ease of management of the buffer memory 1500. Specifically, during the pixel retagging process 922, the buffer memory 1500 memory locations whose Unknown flag is set to true are updated with the same identifier which was stored for the corresponding line-segment in the line segment memory 200. Therefore, the same identifier corresponds to the same pixels in both the line segment memory 200 and those which will eventually be output from the last stage of the buffer memory 1500. The present pixel is later assigned an "unknown" identifier in step 440.

Also in step 1020, for management of the buffer memory 1500, the Unknown flag of the first memory location in the buffer memory is set to False, the Pixel Valid flag of the first memory location in the buffer memory is set to True. Also, the UpdateID flag is set to True.

Processing proceeds at step 1030 with the pixel retagging process 922 illustrated in FIG. 22. The pixel retagging process 922 will be explained with reference to the buffer memory 1500 illustrated in FIGS. 21A-21E.

Beginning at step 1110, if the scan line is complete, the Flush flag and the Scan Line End flag are set to True, step 1120. Alternatively, if the scan line is not complete, the Flush flag and the Scan Line End flag are set to False, step 1130.

If the UpdateID flag 1540 is not true as shown in FIG. 21A, step 1140, processing proceeds by setting the pixel identifier 1530 of the first memory location 1501 in the buffer memory 1500 to the present pixel identifier, step 1150. In the present example, the present pixel identifier is "unknown" and represented by "U" in FIG. 21A.

The contents of the memory locations of the buffer memory 1500 are then shifted by one, step 1160, see FIG. 21B. If the Pixel Valid flag 1510 of the last memory location 1505 in the buffer memory 1500 is not true, step 1170, processing continues by looking to the Scan Line End flag. If the Scan Line End flag is not true, step 1180, processing continues by returning to the method of second pass processing of FIG. 20.

With continued reference to FIG. 22, if the UpdateID flag is true in step 1140 as illustrated in FIG. 21C, the present pixel identifier is assigned to all buffer memory 1500 memory locations whose Unknown flag 1530 is True, step 1190, as shown in FIG. 21D. All Unknown flags are then set to False, preferably by the use of a RstUnknown flag, step 1200.

As shown in FIG. 21E, when the Pixel Valid flag of the last memory location 1505 in the buffer memory 1500 is True at step 1170, processing continues by setting the memory location of the window retagging table 305 equal to the pixel identifier of the last memory location 1505 in the buffer memory 1500, step 1210.

The pixel identifier of an output pixel is then set to the contents of the memory location of the window retagging table 305 equal to the pixel identifier of the last memory location 1505 in the buffer memory 1500, step 1220. The output pixel is the pixel assigned a final identifier as a result of the illustrative embodiment of the present invention. This final identifier will correspond to window label of the appropriate line segment of which the pixel belongs. See FIG. 23.

If the Flush flag is True, step 1230, the process will resume at step 1160, as illustrated in FIG. 22, resulting in outputting the memory locations of the buffer memory 1500 having Pixel Valid flags 1510 set to True.

With reference to FIG. 20, steps 1030, 1040 and 1050 of second pass processing 920 correspond to steps 360, 370 and 380, respectively, of line segment identifier allocation 912 of first pass processing 910 and illustrated in FIG. 6. Steps 1030, 1040 and 1050 further include adjustments to the Unknown flag and the Pixel Valid flag of the first memory location in the buffer memory and the UpdateID flag as described above and illustrated in FIG. 20.

Step 1070 of second pass processing 920, after step 460, is similar to step 1020 discussed above.

Following step 365 of second pass processing 920 is step 1060, the pixel retagging process illustrated in FIG. 22.

The pixel retagging process 922 described above allows the use of a buffer memory 1500 to allow line segments to be determined while analyzing the image. Upon determination of line segments, pixel identifiers can be determined, allowing the pixel to be processed in accordance with the window retagging table 305. Therefore, the buffer memory and associated pixel retagging process 922 allow the output of an enhanced or altered image while the image is being read from the page storage buffer 303 during second pass processing 920 with only a slight delay due to the time required for pixel information to pass through the buffer memory 1500.

Figure 24:
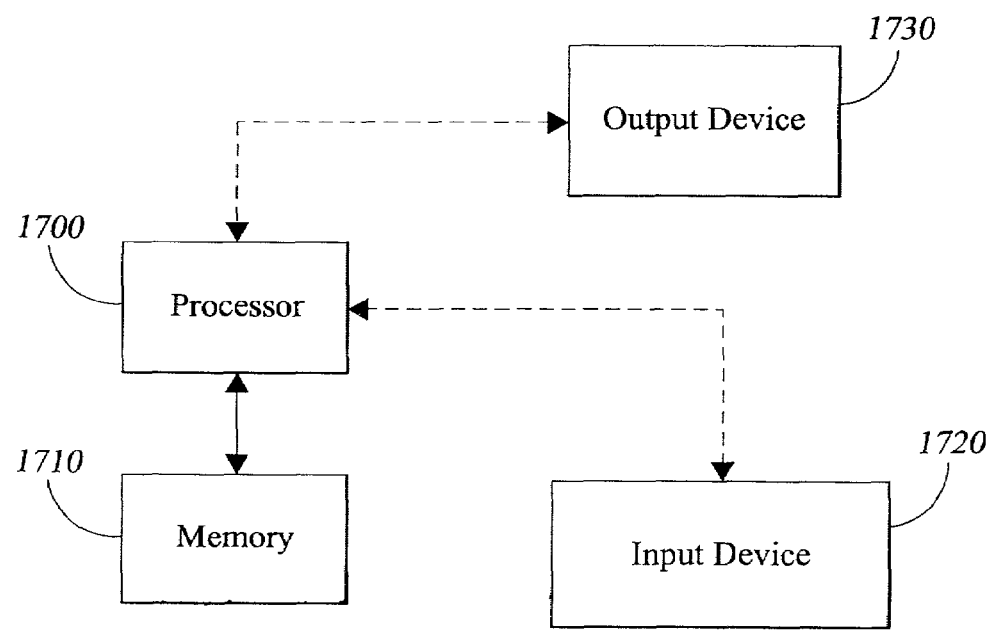
FIG. 24 provides an illustration of an apparatus according to an illustrative embodiment of the present invention.

According to a further illustrative embodiment of the invention, an apparatus is provided. The apparatus is illustrated in FIG. 24. A processor 1700 is provided and is preferably adapted to execute the steps of the methods of the invention. A wide variety of processors may be used. The processor is in communication with a memory 1710 capable of storing data for use by the processor 1710. An input device 1720 in communication with the processor 1700 is preferably provided to enable reading of an image. Some examples of input devices 1720 include an optical scanner and a program capable of reading an electronically stored image. An output device 1730 in communication with the processor 1700 is also preferably provided to enable the outputting of an image according to the present invention. Some examples of output devices 1730 include a printer and a program capable of storing an image in electronic format. It is noted that each of the above components may be located remotely from others and may be in communication with others by wired or wireless communication devices, including electrical and optical devices.

Although the examples herein involve the processing of a page of a document from top-to-bottom, other directions are within the scope of the invention. For example, each page may be processed from side-to-side or from bottom-to-top. Also, various angles of processing are within the scope of the invention. In such a case, the rows and columns are preferably aligned with the direction of processing. Also within the scope of the invention are pixel configurations not involving rows and columns. In such a case, processing may proceed by locating and processing proximate pixels, preferably proceeding until each pixel has been processed.

These examples are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way. The scope of the invention is to be measured by the appended claims, rather than the preceding description, and all variations and equivalents that fall within the range of the claims are intended to be embraced therein.

Having described the invention, what is claimed as new and protected by Letters Patent is:

1. A method of processing content of an image, comprising the steps of:

automatically determining window regions in the image without user assistance by performing a first-pass processing of the image in a selected direction on a line by line basis, wherein the image content is organized in parallel lines of content, the first-pass processing comprising the steps of:
identifying a plurality of line segments of the image content, wherein said plurality of line segments are parallel to a first axis:
allocating line segment identifiers to the plurality of line segments, the allocating comprising:
determining a first segment tag for a first line segment of the plurality of line segments of the image content on a first line parallel to said first axis;
writing a first identifier into a first memory location of an equivalence table and assigning said first identifier to said first line segment;
determining a second segment tag for a second line segment of the plurality of line segments of the image content on a second line parallel and proximate to said first line when said second line segment overlaps a position of said first line segment along said first axis;
if said first segment tag equals said second segment tag, writing said first identifier to a second memory location of said equivalence table; and
if said first segment tag does not equal said second segment tag, writing a second identifier into said second memory location of said equivalence table and assigning said second identifier to said second line segment, wherein said second identifier is not equal to a previously used identifier;
updatinq said identifier number equivalence table, the updating comprising:
reading a past memory location of said equivalence table corresponding to a past identifier and having a corresponding past segment tag to determine a past memory location content;
reading a present memory location of said equivalence table corresponding to a present identifier and having a corresponding present segment tag to determine a present memory location content, wherein said past segment tag is equal to said present segment tag and said past identifier is not equal to said present identifier;
searching for a base identifier of said present identifier, the searching comprising:
determining if said present memory location content points to said present memory location and designating said present memory location as said base identifier if said present memory location content points to said present memory location; and
if said present memory location content does not point to said present memory location, utilizing said present memory location content as said present memory location and repeating said searching steps; and
writing said base identifier to said past memory location; and
storing a graphical representation of the image in a page storage buffer;
generating a windowed image by performing a second-pass processing of the stored graphical representation of the image based on the written identifiers of the first-pass processing; and
outputting the windowed image to at least one of a printed image and a digital image displayed on an output device.

2. The method of processing an image of claim 1, further comprising the step of determining a location of a third line segment by identifying said third line segment on one of said first line and said second line, as contiguous with one of the group of said first line segment and said second line segment extending a lesser distance in a first direction along said first axis such that said third line segment overlaps a position of the other of said group of said first line segment and said second line segment along said first axis.

3. The method of processing an image of claim 1, wherein said first line segment and said second line segment are contiguous.

4. The method of processing an image of claim 1, wherein said first identifier is stored in a first side of a ping pong memory and said second identifier is stored in a second side of a ping pong memory.

5. The method of processing an image of claim 1, wherein all line segments on said first line and all line segments on said second line are processed before processing line segments on a different line.

6. The method of processing an image of claim 1, further including performing an interdocument delay processing during an interdocument delay period following the first-pass processing and preceding the second-pass processing, the interdocument delay processing comprising the steps of:
reducing each of the memory location contents to a respective base identifier; and
producing a window retagging table for use in the second-pass processing, wherein the second-pass processing of the stored graphical representation of the image is based on the written identifiers of the first-pass processing and the produced window retagging table.

7. An apparatus for processing content of an image, comprising:
a memory adapted to store at least one of the group of a first identifier of a first line segment of the image content on a first line and a second identifier of a second line segment of the image content on a second line and storing the image in a page storage buffer portion of the memory;
a processor coupled to said memory and adapted to automatically determine window regions in the image without user assistance by, in a first-pass processing while the image is being received on a line by line basis, forming and frequently updating an identifier equivalence table by comparing said first identifier to said second identifier, determining a first segment tag for said first line segment, determining that said first line segment is eligible for a base identifier search if said first identifier does not equal said second identifier when said first segment tag equals a second segment tag for said second line segment and when said first line segment and said second line segment are neighboring line segments, and conducting a base identifier search for said first line segment, the processor also adapted to store received portions of the image in a page storage buffer portion of the memory thereby generating a stored graphical representation of the image, and further adapted to perform a second-pass processing to produce a windowed image based on the stored graphical representation of the image and determinations and searches of the first-pass processing; and
an output device adapted to receive the windowed image and produce at least one of a printed image and a digital image displayed on the output device;

wherein said first line and said second line are parallel to a first axis and said first line segment overlaps said second line segment.

8. The apparatus for processing an image of claim 7, wherein said base identifier search comprises the steps of:
reading a first memory location of said memory to determine a first memory location content;
pointing to a further memory location of said memory, corresponding to said first memory location content;
if said first memory location content does not point to said first memory location, read a further memory location content of said further memory location;
continuing to point to succeeding memory locations of said memory until a memory location content points to its own memory location and designating said memory location as a base identifier; and
writing said base identifier to said first memory location.

9. The apparatus for processing an image of claim 7, wherein a first scan line of a page of said image is said first line and a last scan line of said page of said image is said second line and all remaining scan lines of said page of said image are selectively, alternatively designated as said first line and said second line during processing.

10. The apparatus for processing an image of claim 7, wherein said first line segment and said second line segment are contiguous.

11. The apparatus of claim 7, further comprising an input device coupled to said processor to enable said processor to determine said first segment tag.

12. The apparatus of claim 11, wherein said input device is a scanner.

13. The apparatus for processing an image of claim 7, the processor further adapted to, in an interdocument delay processing during an interdocument delay period following the first-pass processing and preceding the second-pass processing, reduce each of a plurality of memory location contents to a respective base identifier, and produce a window retagging table for use in the second-pass processing, wherein the second-pass processing of the stored graphical representation of the image is based on the determinations and searches of the first-pass processing and the produced window retagging table.

14. A method for processing content of an image comprising parallel rows of pixels, the method comprising the steps of:
automatically determining window regions in the image without user assistance by performing a first-pass processing of the image content in a selected direction on a row by row basis, the first-pass processing comprising the steps of:
for each row of the image, allocating pixel identifiers to the pixels, the allocating comprising:
determining a pixel tag corresponding to a pixel content type of a pixel of a present row;
determining a pixel identifier based on said pixel tag and pixel identifiers and pixel taps of neighboring pixels in said present row and in a previously allocated row, wherein said determined pixel identifier is selected from a neighboring pixel having an equal pixel tag or a new pixel identifier not equal to a previously used pixel identifier; and
forming line segments of neighboring pixels of said present row having common pixel identifiers;
reviewing said line segments to associate neighboring line segments having common pixel tags but having differing pixel identifiers by associating said differing pixel identifiers; and
storing a graphical representation of the image in a page storage buffer;
performing a second-pass processing of the stored graphical representation of the image based on identifiers and associations of the first-pass processing to produce an enhanced image; and
outputting the enhanced image to at least one of a printed image and a digital image displayed on an output device.

15. The method of claim 14, further comprising the step of, in the first-pass processing, assigning a line segment identifier to each of said line segments, wherein said line segment identifier corresponds to said pixel identifiers of said pixels forming each of said line segment.

16. The method of claim 15, further comprising the step of, in the first-pass processing, storing said line segment identifiers for each of said line segments in said present row and said previously allocated row in a line segment memory.

17. The method of claim 14, further comprising the step of, in the first-pass processing, forming an identifier equivalence table to store said associations of said line segments of said previously allocated row neighboring line segments of said Present row and having common pixel tags.

18. The method of claim 17, further comprising the step of, in the first-pass processing, performing a base identifier search to update said identifier equivalence table and associate line segments of at least a third row, the base identifier search being performed selectively during an inter-scanline delay time between each scan line, or during alternate scan lines.

19. The method of claim 18, further comprising the step of, following the first-pass processing and preceding the second-pass processing, processing said identifier equivalence table to assign window labels during an interdocument delay period, wherein each window label is associated with an area of said image having pixels of a common content type.

* * * * *